(12) United States Patent
Yang

(10) Patent No.: US 9,129,011 B2
(45) Date of Patent: Sep. 8, 2015

(54) MOBILE TERMINAL AND CONTROL METHOD THEREOF

(75) Inventor: Seung-Jin Yang, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 179 days.

(21) Appl. No.: 12/433,133

(22) Filed: Apr. 30, 2009

(65) Prior Publication Data

US 2010/0105364 A1  Apr. 29, 2010

(30) Foreign Application Priority Data

Oct. 29, 2008  (KR) .................. 10-2008-0106736

(51) Int. Cl.
| | | |
|---|---|---|
| H04M 1/00 | (2006.01) | |
| G06F 17/30 | (2006.01) | |
| H04M 1/725 | (2006.01) | |
| H04M 3/493 | (2006.01) | |
| G06F 3/16 | (2006.01) | |

(52) U.S. Cl.
CPC .......... *G06F 17/30663* (2013.01); *G06F 3/167* (2013.01); *G06F 17/30899* (2013.01); *H04M 1/72561* (2013.01); *H04M 3/4938* (2013.01); *H04M 2250/22* (2013.01); *H04M 2250/74* (2013.01)

(58) Field of Classification Search
None
See application file for complete search history.

(56) References Cited

U.S. PATENT DOCUMENTS

| | | | |
|---|---|---|---|
| 4,829,576 A | | 5/1989 | Porter |
| 5,819,220 A * | | 10/1998 | Sarukkai et al. ........... 704/270.1 |
| 6,724,403 B1 * | | 4/2004 | Santoro et al. ................. 715/765 |
| 7,039,635 B1 * | | 5/2006 | Morgan et al. .......................... 1/1 |
| 7,346,613 B2 * | | 3/2008 | Hurst-Hiller et al. ......... 707/711 |
| 7,366,668 B1 * | | 4/2008 | Franz et al. .................... 704/252 |
| 7,672,931 B2 * | | 3/2010 | Hurst-Hiller et al. .. 707/999.003 |
| 2002/0010586 A1 * | | 1/2002 | Ito et al. ..................... 704/270.1 |
| 2003/0125956 A1 | | 7/2003 | Lewis et al. |
| 2003/0156130 A1 | | 8/2003 | James et al. |
| 2004/0267739 A1 * | | 12/2004 | Dowling ............................ 707/3 |
| 2005/0177359 A1 * | | 8/2005 | Lu et al. ........................ 704/200 |
| 2006/0041848 A1 * | | 2/2006 | Lira ............................... 715/805 |
| 2007/0088557 A1 | | 4/2007 | Andrew |
| 2008/0153465 A1 * | | 6/2008 | Evermann et al. ......... 455/414.1 |
| 2008/0288252 A1 * | | 11/2008 | Cerra et al. ................... 704/244 |
| 2009/0043777 A1 * | | 2/2009 | Wyler et al. ..................... 707/10 |
| 2009/0138439 A1 * | | 5/2009 | Yeung et al. ...................... 707/3 |
| 2009/0228281 A1 * | | 9/2009 | Singleton et al. ............. 704/275 |
| 2009/0234811 A1 * | | 9/2009 | Jamil et al. ......................... 707/3 |
| 2010/0069123 A1 * | | 3/2010 | Araradian et al. ............ 455/566 |

(Continued)

FOREIGN PATENT DOCUMENTS

| | | |
|---|---|---|
| KR | 2000-0036801 A | 7/2000 |
| KR | 2003-0088087 A | 11/2003 |

(Continued)

*Primary Examiner* — Kent Chang
*Assistant Examiner* — Benjamin Morales Fernande
(74) *Attorney, Agent, or Firm* — Birch, Stewart, Kolasch & Birch, LLP

(57) ABSTRACT

A mobile terminal including a wireless communication unit configured to access a web page, a display unit configured to display the accessed web page, a receiving unit configured to receive input voice information, and a controller configured to convert the input voice information into text information, to search the displayed web page for objects that include the converted text information, and to control the display unit to distinctively display found objects that include the converted text information from other information displayed on the web page.

12 Claims, 26 Drawing Sheets

(56) References Cited

U.S. PATENT DOCUMENTS

2010/0100383 A1* 4/2010 Tsai et al. .................... 704/257
2011/0113062 A1* 5/2011 Quinlan et al. ............... 707/770

FOREIGN PATENT DOCUMENTS

| WO | WO 99/48088 A1 | 9/1999 |
| WO | WO 2008/083176 A2 | 7/2008 |

* cited by examiner

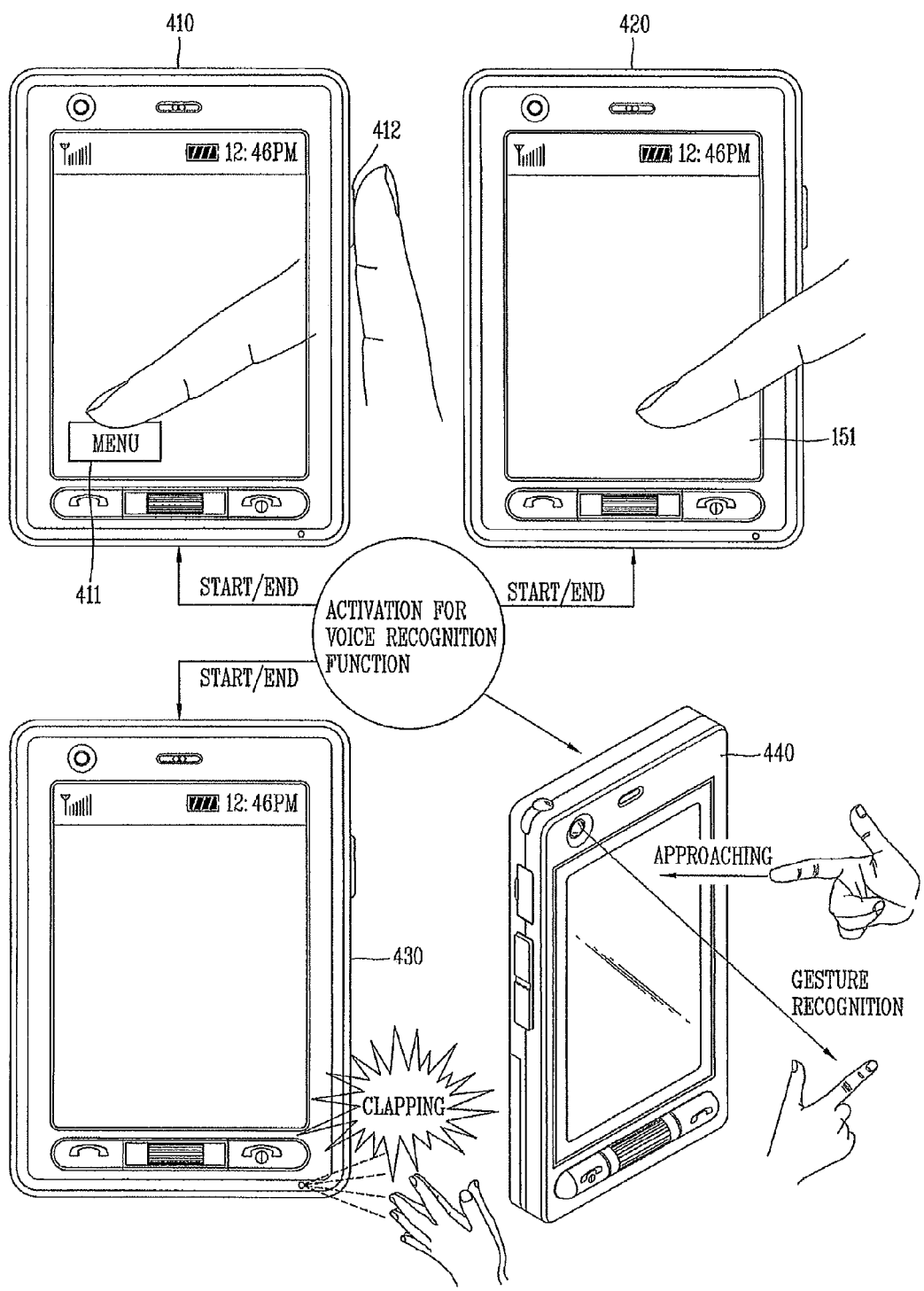

MOBILE TERMINAL AND CONTROL METHOD THEREOF

CROSS-REFERENCE TO A RELATED APPLICATION

The present disclosure relates to subject matter contained in priority Korean Application No. 10-2008-0106736, filed on Oct. 29, 2008, which is herein expressly incorporated by reference in its entirety.

BACKGROUND OF THE INVENTION

1. Field of the Invention

The present invention relates to a mobile terminal and corresponding method for searching objects on a displayed web page.

2. Background of the Invention

Mobile terminals now provide many additional services beside the basic call service. For example, user's can now access the Internet, play games, watch videos, listen to music, capture images and videos, record audio files, etc. Mobile terminals also now provide broadcasting programs such that user can watch television shows, sporting programs, videos etc.

In addition, mobile terminals also provide web browsing functions, However, because the mobile terminal display is small in size, it is difficult to select items or links displayed on a particular web page. It is also difficult to search for information using web browsing functions.

SUMMARY OF THE INVENTION

Accordingly, one object of the present invention is to address the above-noted and other problems.

Another object of the present invention is to provide a mobile terminal and corresponding method for performing and information search through a voice command in a web browsing mode.

Yet another object of the present invention is to provide a mobile terminal and corresponding method for entering an information search mode from a web browsing mode through a voice command.

Another object of the present invention is to provide a mobile terminal and corresponding method for inputting a search word on an information search window through a voice command in a web browsing mode.

Still another object of the present invention is to provide a mobile terminal and corresponding method for indicating a search execution through a voice command in a web browsing mode.

Another object of the present invention is to provide a mobile terminal and corresponding method for selecting through a voice command information searched in a web browsing mode, and displaying a web page relating to the selected information.

Still yet another object of the present invention is to provide a mobile terminal and corresponding method for searching information on a currently displayed web page based on a voice command.

To achieve these and other advantages and in accordance with the purpose of the present invention, as embodied and broadly described herein, the present invention provides in one aspect a mobile terminal including a wireless communication unit configured to access a web page, a display unit configured to display the accessed web page, a receiving unit configured to receive input voice information, and a controller configured to convert the input voice information into text information, to search the displayed web page for objects that include the converted text information, and to control the display unit to distinctively display found objects that include the converted text information from other information displayed on the web page.

In another aspect, the present invention provides a method of controlling a mobile terminal, and which includes displaying an accessed web page on a display of the mobile terminal, receiving input voice information, converting the input voice information into text information, searching the displayed web page for objects that include the converted text information, and distinctively displaying found objects that include the converted text information from other information displayed on the web page.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6A includes overviews of display screens illustrating a method for activating a voice recognition function in a mobile terminal according to an embodiment of the present invention;

DETAILED DESCRIPTION OF THE INVENTION

Hereinafter, a mobile terminal relating to the present invention will be described below in more detail with reference to the accompanying drawings. Further, the mobile terminal described in the specification can include a cellular phone, a smart phone, a laptop computer, a digital broadcasting terminal, personal digital assistants (PDA), a portable multimedia player (PMP), a navigation system and so on.

Figure 1:
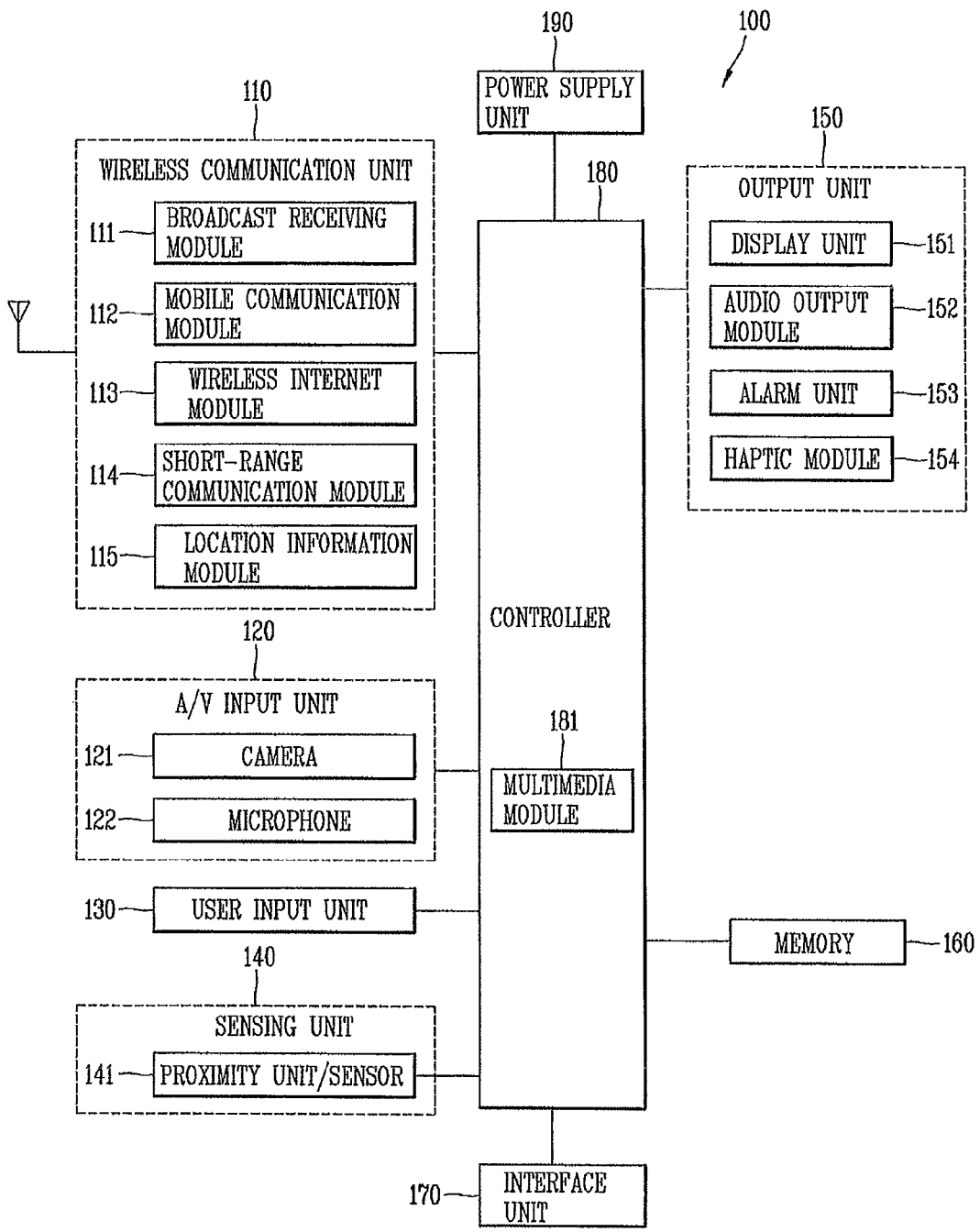
FIG. 1 is a block diagram of a mobile terminal according to an embodiment of the present invention.

FIG. 1 is a block diagram of a mobile terminal 100 according to an embodiment of the present invention. As shown, the mobile terminal 100 includes a radio communication unit 110, an audio/video (A/V) input unit 120, a user input unit 130, a sensing unit 140, an output unit 150, a memory 160, an interface 170, a controller 180, and a power supply 190. Not all of the components shown in FIG. 1 are essential parts and the number of components included in the mobile terminal can be varied.

In addition, the radio communication unit 110 includes at least one module that enables radio communication between the mobile terminal 100 and a radio communication system or between the mobile terminal 100 and a network in which the mobile terminal 100 is located. For example, in FIG. 1, the radio communication unit 110 includes a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel. Further, the broadcasting channel can include a satellite channel and a terrestrial channel. Also, the broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals but also signals in the form of a combination of a TV broadcasting signal and a radio broadcasting signal.

In addition, the broadcasting related information can be information on a broadcasting channel, a broadcasting program or a broadcasting service provider. The broadcasting related information can also be provided through a mobile communication network. In this instance, the broadcasting related information can be received by the mobile communication module 112. The broadcasting related information can also exist in various forms. For example, the broadcasting related information can exist in the form of an electronic program guide (EPG) of the digital multimedia broadcasting (DMB) system or in the form of an electronic service guide (ESG) of the digital video broadcast-handheld (DVB-H) system.

In addition, the broadcasting receiving module 111 receives broadcasting signals using various broadcasting systems. In particular, the broadcasting receiving module 111 can receive digital broadcasting signals using digital broadcasting systems such as the digital multimedia broadcasting-terrestrial (DMB-T) system, the digital multimedia broadcasting-satellite (DMB-S) system, the media forward link only (MediaFLO) system, the DVB-H system and the integrated services digital broadcast-terrestrial (ISDB-T) system. The broadcasting receiving module 111 can also be constructed to be suited to broadcasting systems providing broadcasting signals other than the above-described digital broadcasting systems. The broadcasting signals and/or broadcasting related information received through the broadcasting receiving module 111 can also be stored in the memory 160.

Further, the mobile communication module 112 transmits/receives a radio signal to/from at least one of a base station, an external terminal, and a server on a mobile communication network. The radio signal can include a voice call signal, a video telephony call signal or data in various forms according to transmission and receiving of text/multimedia messages.

The wireless Internet module 113 corresponds to a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique. The local area communication module 114 corresponds to a module for local area communication. Bluetooth, radio frequency identification (RFID), infrared data association (IrDA), ultra wideband (UWB) and ZigBee can be used as a local area communication technique.

In addition, the position information module 115 confirms or obtains the position of the mobile terminal 100. A global positioning system (GPS) module is a representative example of the position information module 115. Further, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude coordinate at a predetermined time. Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and includes a camera 121 and a microphone 122. The camera 121 processes image frames of still images or moving images obtained by an image sensor in a video telephony mode or a photographing mode. The processed image frames can be displayed on a display unit 151 included in the output unit 150. In addition, the image frames processed by the camera 121 can be stored in the memory 160 or transmitted to an external device through the radio communication unit 110. The mobile terminal 100 can also include at least two cameras according to constitution of the terminal.

Further, the microphone 122 receives an external audio signal in a call mode, a recording mode or a speed recognition mode and processes the received audio signal into electric audio data. The audio data can also be converted into a form that can be transmitted to a mobile communication base station through the mobile communication module 112 and output in the call mode. The microphone 122 can employ various noise removal algorithms for removing noise generated when the external audio signal is received.

In addition, the user input unit 130 receives input data for controlling the operation of the terminal from a user. The user input unit 130 can include a keypad, a dome switch, a touch pad (constant voltage/capacitance), jog wheel, jog switch and so on. The sensing unit 140 senses the current state of the mobile terminal 100, such as open/close state of the mobile terminal 100, the position of the mobile terminal 100, whether a user touches the mobile terminal 100, the direction of the mobile terminal 100 and acceleration/deceleration of the mobile terminal 100 and generates a detection signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can also include a proximity sensor 141.

In addition, the output unit 150 generates visual, auditory or tactile output and can include the display unit 151, an audio output module 152, an alarm 153 and a haptic module 154. The display unit 151 displays information processed by the mobile terminal 100. For example, the display unit 151 displays a UI or graphic user interface (GUI) related to a telephone call when the mobile terminal is in the call mode. The display unit 151 also displays a captured or/and received image, UL or GUI when the mobile terminal 100 is in the video telephony mode or the photographing mode.

The display unit 151 can also include at least one of a liquid crystal display, a thin film transistor liquid crystal display, an organic light-emitting diode display, a flexible display and a three-dimensional display. Some of these displays can be of a transparent type or a light transmission type, which is referred to as a transparent display. The transparent display also includes a transparent liquid crystal display. The rear structure of the display unit 151 can also be of the light transmission type. According to this structure, a user can see an object located behind the body of the mobile terminal 100 through an area of the body of the mobile terminal 100, which is occupied by the display unit 151.

Further, the mobile terminal 100 can include at least two display units 151 according to constitution of the terminal. For example, the mobile terminal 100 can include a plurality of displays that are arranged on a single face at a predetermined distance or integrated. Otherwise, the plurality of displays can be arranged on different sides. In addition, when the display unit 151 and a sensor sensing touch (referred to as a touch sensor hereinafter) form a layered structure, which is referred to as a touch screen hereinafter, the display unit 151 can be used as an input device in addition to an output device. The touch sensor can be in the form of a touch film, a touch sheet and a touch pad, for example.

Also, the touch sensor can be constructed such that it converts a variation in pressure applied to a specific portion of the display unit 151 or a variation in capacitance generated at a specific portion of the display unit 151 into an electric input signal. The touch sensor can also be constructed such that it can sense pressure of touch as well as the position and area of touch. When touch input is applied to the touch sensor, a signal corresponding to the touch input is transmitted to a touch controller. The touch controller then processes the signal and transmits data corresponding to the processed signal to the controller 180. Accordingly, the controller 180 can detect a touched portion of the display 151.

Referring to FIG. 1, the proximity sensor 141 can be located in an internal region of the mobile terminal 100, surrounded by the touch screen, or near the touch screen. The proximity sensor 141 senses an object approaching a predetermined sensing face or an object located near the proximity sensor 141 using an electromagnetic force or infrared rays without having mechanical contact. Further, the proximity sensor 141 has a lifetime longer than that of a contact sensor and has a wide application. The proximity sensor 141 also includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

In addition, a capacitive touch screen is constructed such that a proximity of a pointer is detected through a variation in an electric field according to the proximity of the pointer. In this instance, the touch screen (touch sensor) can be classified as a proximity sensor. For convenience of explanation, an action of approaching the pointer to the touch screen while the pointer it not in contact with the touch screen such that the location of the pointer on the touch screen is recognized is referred to as "proximity touch" and an action of bringing the pointer into contact with the touch screen is referred to as "contact touch" in the following description. Also, a proximity touch point of the pointer on the touch screen means a point of the touch screen to which the pointer corresponds perpendicularly to the touch screen when the pointer proximity-touches the touch screen.

Further, the proximity sensor 141 senses a proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can also be displayed on the touch screen. Also, the audio output module 152 can output audio data received from the radio communication unit 110 or stored in the memory 160 in a call signal receiving mode, a telephone call mode or a recording mode, a speech recognition mode and a broadcasting receiving mode. The audio output module 152 also outputs audio signals related to functions (for example, a call signal incoming tone, a message incoming tone, etc.) performed in the mobile terminal 100. The audio output module 152 can include a receiver, a speaker, a buzzer, etc.

The alarm 153 outputs a signal for indicating generation of an event of the mobile terminal 100. Examples of events generated in the mobile terminal 100 include receiving a call signal, receiving a message, input of a key signal, input of touch, etc. The alarm 153 can also output signals in forms different from video signals or audio signals, for example, a signal for indicating a generation of an event through vibration. The video signals or the audio signals can also be output through the display unit 151 or the audio output module 152.

In addition, the haptic module 154 generates various haptic effects that the user can feel. A representative example of the haptic effect is vibration. The intensity and pattern of vibration generated by the haptic module 154 can also be controlled. For example, different vibrations can be combined and output or sequentially output. The haptic module 154 can also generate a variety of haptic effects including an effect of stimulus according to arrangement of pins vertically moving for a contact skin face, an effect of stimulus according to a jet force or sucking force of air through a jet hole or a sucking hole, an effect of stimulus rubbing the skin, an effect of stimulus according to contact of an electrode, an effect of stimulus using an electrostatic force and an effect according to reproduction of cold and warmth using an element capable of absorbing or radiating heat in addition to vibrations. Further, the haptic module 154 can not only transmit haptic effects through direct contact but also allow the user to feel haptic effects through kinesthetic sense of his or her fingers or arms. The mobile terminal 100 can also include at least two or more haptic modules 154 according to constitution of the mobile terminal.

In addition, the memory 160 stores a program for the operation of the controller 180 and temporarily stores input/output data (for example, phone book, messages, still images, moving images, etc.). The memory 160 can also store data about vibrations and sounds in various patterns, which are output when a touch input is applied to the touch screen. The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can also operate in relation to a web storage performing the storing function of the memory 160 on the Internet.

Further, the interface 170 serves as a path to all external devices connected to the mobile terminal 100. The interface 170 receives data from the external devices or power and transmits the data or power to the internal components of the mobile terminal 100 or transmits data of the mobile terminal 100 to the external devices. The interface 170 can also include a wired/wireless headset port, an external charger port, a wired/wireless data port, a memory card port, a port for connecting a device having a user identification module, an audio I/O port, a video I/O port, an earphone port, etc., for example.

In addition, an identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a port.

Also, the interface 170 can serve as a path through which power from an external cradle is provided to the mobile terminal 100 when the mobile terminal 100 is connected to the external cradle or a path through which various command signals input by the user through the cradle to the mobile terminal 100. The various command signals or power input from the cradle can be used as a signal for confirming whether the mobile terminal 100 is correctly set in the cradle.

The controller 180 controls the overall operation of the mobile terminal. For example, the controller 180 performs control and processing for voice communication, data communication and video telephony. In FIG. 1, the controller 180 includes a multimedia module 181 for playing multimedia. The multimedia module 181 can be included in the controller 180 or separated from the controller 180. Further, the controller 180 can perform a pattern recognition process capable of recognizing handwriting input or picture-drawing input applied to the touch screen as characters or images. In addition, the power supply 190 receives external power and internal power and provides power required for the operations of the components of the mobile terminal under the control of the controller 180.

Further, various embodiments of the present invention can be implemented in a computer or similar device readable recording medium using software, hardware or a combination thereof, for example. According to a hardware implementation, the embodiments of the present invention can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. The embodiments can also be implemented by the controller 180.

According to a software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Figure 2A:
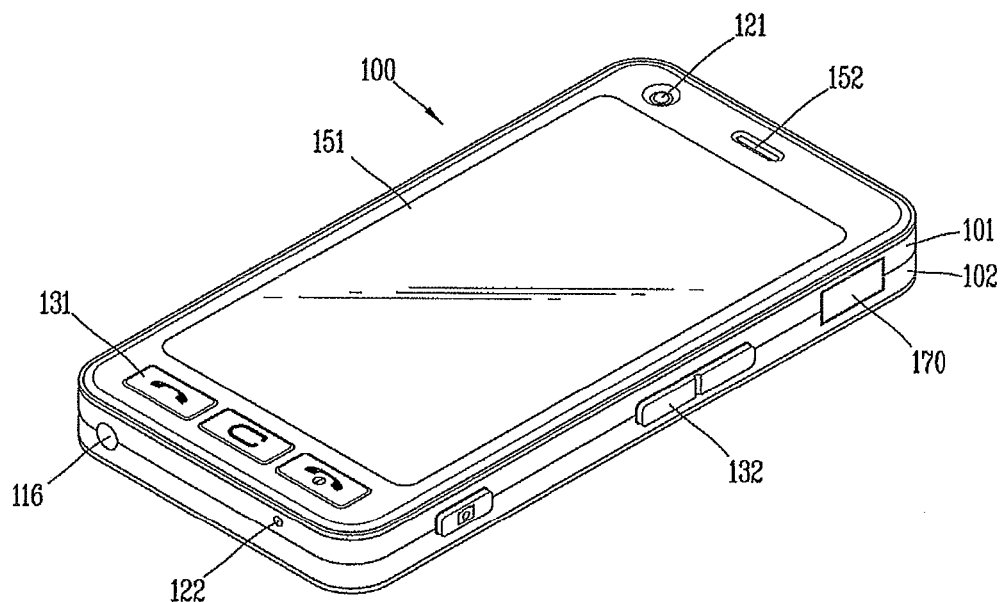
FIG. 2A is a front perspective view of the mobile terminal according to an embodiment of the present invention.

Next, FIG. 2A is a front perspective view of a mobile terminal or a handheld terminal 100 according to an embodiment of the present invention. As shown, the handheld terminal 100 has a bar type terminal body. However, the present invention is not limited to a bar type terminal and can be applied to terminals of various types including a slide type, folder type, swing type and swivel type terminals having at least two bodies that are relatively movably combined.

In addition, the terminal body includes a case (a casing, a housing, a cover, etc.) forming the exterior of the terminal 100. In the present embodiment, the case is divided into a front case 101 and a rear case 102. Various electronic components are also arranged in the space formed between the front case 101 and the rear case 102. At least one middle case can be additionally arranged between the front case 101 and the rear case 102. The cases can also be formed of plastics through injection molding or made of a metal material such as stainless steel (STS) or titanium (Ti).

In addition, the display unit 151, the audio output unit 152, the camera 121, user input units 131 and 132 of the user input unit 130 (FIG. 1), the microphone 122 and the interface 170 are arranged in the terminal body, specifically, in the front case 101. Also, the display unit 151 occupies most part of the main face of the front case 101. The audio output unit 152 and the camera 121 are arranged in a region in proximity to one of both ends of the display unit 151, and the user input unit 131 and the microphone 122 are located in a region in proximity to the other end of the display unit 151. In addition, the user input unit 132 and the interface 170 are arranged on the sides of the front case 101 and the rear case 102.

Further, the user input unit 130 is operated to receive commands for controlling the operation of the handheld terminal 100 and can include the plurality of operating units 131 and 132. The operating units 131 and 132 can be referred to as manipulating portions and employ any tactile manner in which a user operates the operating units 131 and 132 while having tactile feeling. The operating units 131 and 132 can also receive various inputs. For example, the operating unit 131 receives commands such as start, end and scroll, and the second operating unit 132 receives commands such as control of the volume of sound output from the audio output unit 152 or conversion of the display unit 151 to a touch recognition mode.

Figure 2B:
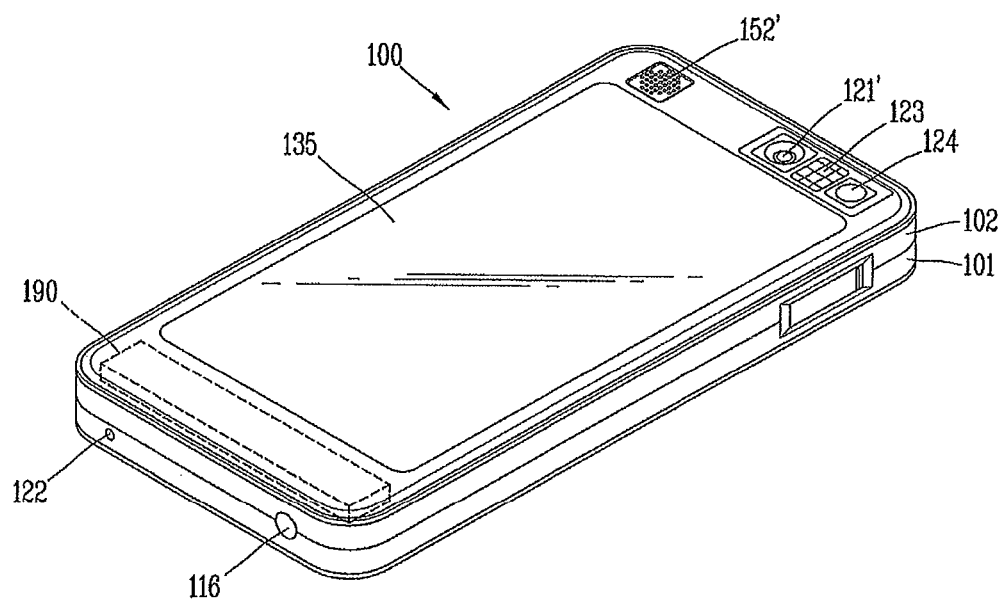
FIG. 2B is a rear perspective view of the mobile terminal according to an embodiment of the present invention.

Next, FIG. 2B is a rear perspective view of the handheld terminal shown in FIG. 2A according to an embodiment of the present invention. Referring to FIG. 2B, a camera 121' is additionally attached to the rear side of the terminal body, that is, the rear case 102. The camera 121' has a photographing direction opposite to that of the camera 121 shown in FIG. 2A and can have pixels different from those of the camera 121 shown in FIG. 2A. For example, it is preferable that the camera 121 has low pixels such that it can capture an image of the face of a user and transmit the image to a receiving part for video telephony, while the camera 121' has high pixels because it captures an image of a general object and does not immediately transmit the image in many instances. The cameras 121 and 121' can also be attached to the terminal body such that they can be rotated or pop-up.

A flash bulb 123 and a mirror 124 are additionally arranged in proximity to the camera 121'. The flash bulb 123 lights an object when the camera 121' takes a picture of the object, and the mirror 124 is used for the user to look at his/her face in the mirror when the user wants to self-photograph himself/herself using the camera 121'. An audio output unit 152' is additionally provided on the rear side of the terminal body. The audio output unit 152' can thus achieve a stereo function with the audio output unit 152 shown in FIG. 2A and be used for a speaker phone mode when the terminal is used for a telephone call. A broadcasting signal receiving antenna 124 is also attached to the side of the terminal body in addition to an antenna for telephone calls. The antenna 124 constructing a part of the broadcasting receiving module 111 shown in FIG. 1 can be set in the terminal body such that the antenna 124 can be pulled out of the terminal body.

Further, the power supply 190 for providing power to the handheld terminal 100 is set in the terminal body. The power supply 190 can be included in the terminal body or detachably attached to the terminal body. A touch pad 135 for sensing touch is also attached to the rear case 102. The touch pad 135 can be of a light transmission type as the display unit 151. In this instance, if the display unit 151 outputs visual information through both sides thereof, the visual information can be recognized through the touch pad 135. The information output through both sides of the display unit 151 can also be controlled by the touch pad 135. Otherwise, a display is additionally attached to the touch pad 135 such that a touch screen can be arranged even in the rear case 102.

Figure 3A:
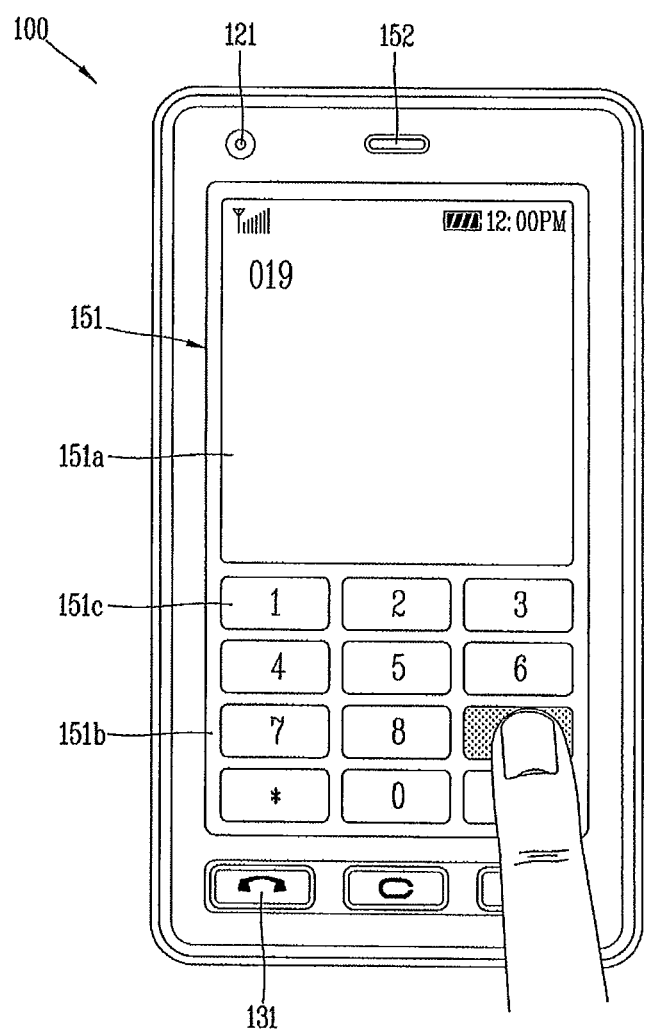
FIGS. 3A and 3B are front views showing an operation state of the mobile terminal according to an embodiment of the present invention.
Figure 3B:
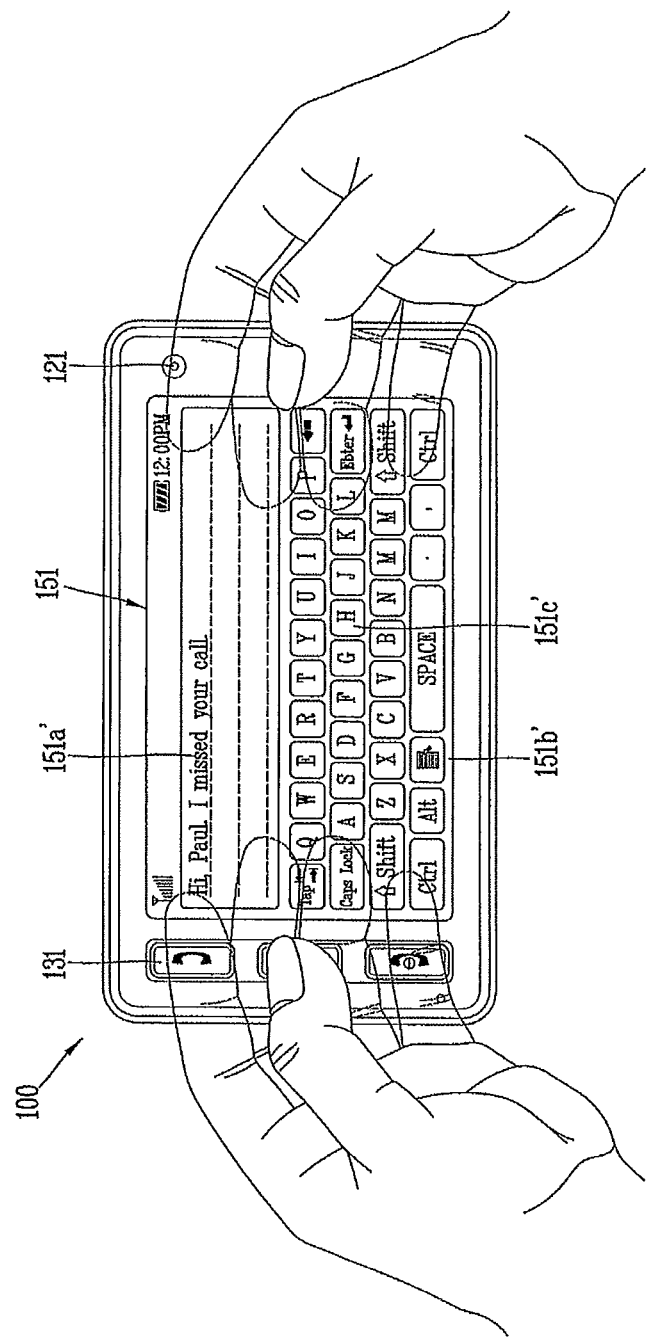

The touch pad 135 also operates in connection with the display unit 151 of the front case 101. The touch pad 135 can be located in parallel with the display unit 151 behind the display unit 151, and can be identical to or smaller than the display unit 151 in size. Interoperations of the display unit 151 and the touch pad 135 will now be described with reference to FIGS. 3A and 3B. In more detail, FIGS. 3A and 3B are front views of the handheld terminal 100 for explaining an operating state of the handheld terminal according to an embodiment of the present invention. In addition, the display unit 151 can display various types of visual information in the form of characters, numerals, symbols, graphic or icons. To input the information, at least one of the characters, numerals, symbols, graphic and icons are displayed in predetermined arrangement in the form of a keypad. This keypad can be referred to as a 'soft key'.

Further, FIG. 3A shows that a touch applied to a soft key is input through the front side of the terminal body. The display unit 151 can be operated through the overall area thereof. Otherwise, the display unit 151 can be divided into a plurality of regions and operated. In the latter instance, the display unit 151 can be constructed such that the plurality of regions interoperate. For example, an output window 151a and an input window 151b are respectively displayed in upper and lower parts of the display unit 151. The input window 151b displays soft keys 151c that represent numerals used to input numbers such as telephone numbers. When a soft key 151c is touched, a numeral corresponding to the touched soft key is displayed on the output window 151a. When the user operates a first operating unit 116, connection of a call corresponding to a telephone number displayed on the output window 151a is attempted.

Next, FIG. 3B shows that a touch applied to soft keys is input through the rear side of the terminal body. FIG. 3B also shows the landscape of the terminal body, while FIG. 3A shows the portrait of the terminal body. That is, the display unit 151 can be constructed such that an output image is converted according to the direction in which the terminal body is located. Further, FIG. 3B shows the operation of the handheld terminal in a text input mode. As shown, the display unit 151 displays an output window 135a and an input window 135b. A plurality of soft keys 135c that indicate at least one of characters, symbols and numerals are arranged in the input window 135b. The soft keys 135c can also be arranged in the form of QWERTY keys.

When the soft keys 135c are touched through the touch pad 135, characters, numerals and symbols corresponding to the touched soft keys 135c are displayed on the output window 135a. Touch input through the touch pad 135 can prevent the soft keys 135c from being covered with the user's fingers when the soft keys 135c are touched as compared to touch input through the display unit 151. When the display unit 151 and the touch pad 135 are transparent, fingers located behind the terminal body can be seen by the user, and thus touch input can be performed more correctly.

In addition, the display unit 151 or the touch pad 135 can be constructed such that it receives touch input in a scroll manner. That is, the user can scroll the display unit 151 or the touch pad 135 to move an object displayed on the display unit 151, for example, a cursor or a pointer located on an icon. Furthermore, when the user moves his or her finger on the display unit 151 or the touch pad 135, the finger moving path can be visually displayed on the display unit 151. This will be useful to edit an image displayed on the display unit 151. Also, when the display unit 151 (touch screen) and the touch pad 135 are simultaneously touched in a predetermined period of time, a specific function of the terminal can be executed. This can include when the user clamps the terminal body using the thumb and the index finger. The specific function can include activation or inactivation of the display unit 151 or the touch pad 135, for example.

Figure 4:
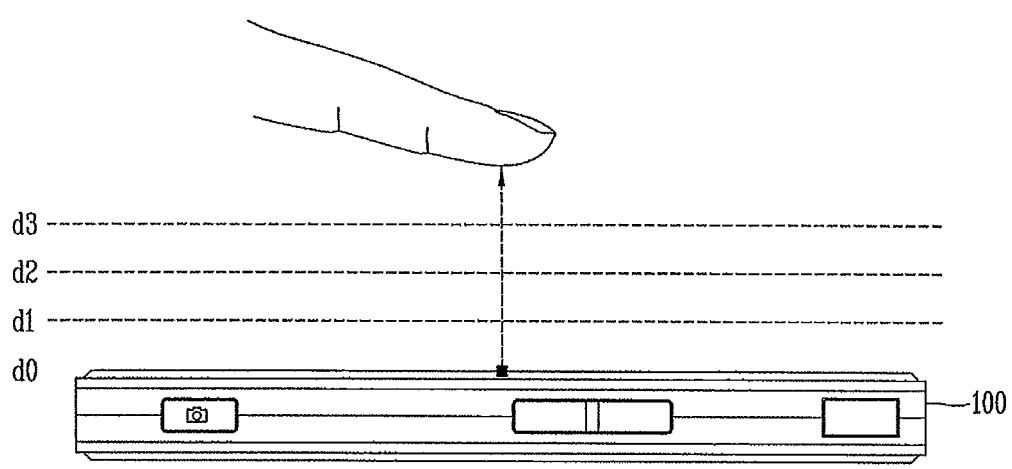
FIG. 4 is a conceptual view showing a proximity depth measured by a proximity sensor.

The proximity sensor 141 described with reference to FIG. 1 will now be explained in more detail with reference to FIG. 4. That is, FIG. 4 is a conceptual view for explaining a proximity depth of the proximity sensor 141. As shown in FIG. 4, when a pointer such as a user's finger approaches the touch screen, the proximity sensor 141 located inside or near the touch screen senses the approach and outputs a proximity signal. The proximity sensor 141 can be constructed such that it outputs a proximity signal according to the distance between the pointer approaching the touch screen and the touch screen (referred to as "proximity depth"). The distance in which the proximity signal is output when the pointer approaches the touch screen is referred to as a detection distance. The proximity depth can be known by using a plurality of proximity sensors having different detection distances and comparing proximity signals respectively output from the proximity sensors.

Further, FIG. 4 shows the section of the touch screen in which proximity sensors capable of sensing three proximity depths are arranged. Proximity sensors capable of sensing less than three or more than four proximity depths can be arranged in the touch screen. Specifically, when the pointer completely comes into contact with the touch screen (D0), it is recognized as contact touch. When the pointer is located within a distance D1 from the touch screen, it is recognized as proximity touch of a first proximity depth, and when the pointer is located in a range between the distance D1 and a distance D2 from the touch screen, it is recognized as proximity touch of a second proximity depth. Further, when the pointer is located in a range between the distance D2 and a distance D3 from the touch screen, it is recognized as proximity touch of a third proximity depth, and when the pointer is located at longer than the distance D3 from the touch screen, it is recognized as cancellation of proximity touch. Accordingly, the controller 180 can recognize the proximity touch as various input signals according to the proximity distance and proximity position of the pointer with respect to the touch screen and perform various operation controls according to the input signals.

In the following description, a control method applicable to the above-configured mobile terminal 100 is explained with respect to various embodiments. However, the following embodiments can be implemented independently or through combinations thereof. In addition, in the following description, it is assumed that the display 151 includes a touch screen.

The mobile terminal according to the present invention is configured such that an algorithm for voice recognition and an algorithm for Speech To Text (STT) are stored in the memory 160. Further, the voice recognition function and the STT function cooperate together so as to convert a user's voice into a text format. The converted text can also be output on an execution screen of the terminal. Thus, the user can perform functions such as generating text for text messages or mails, etc. by speaking into the terminal. The controller 180 can also activate the voice recognition function and automatically drive the STT function.

Figure 5:
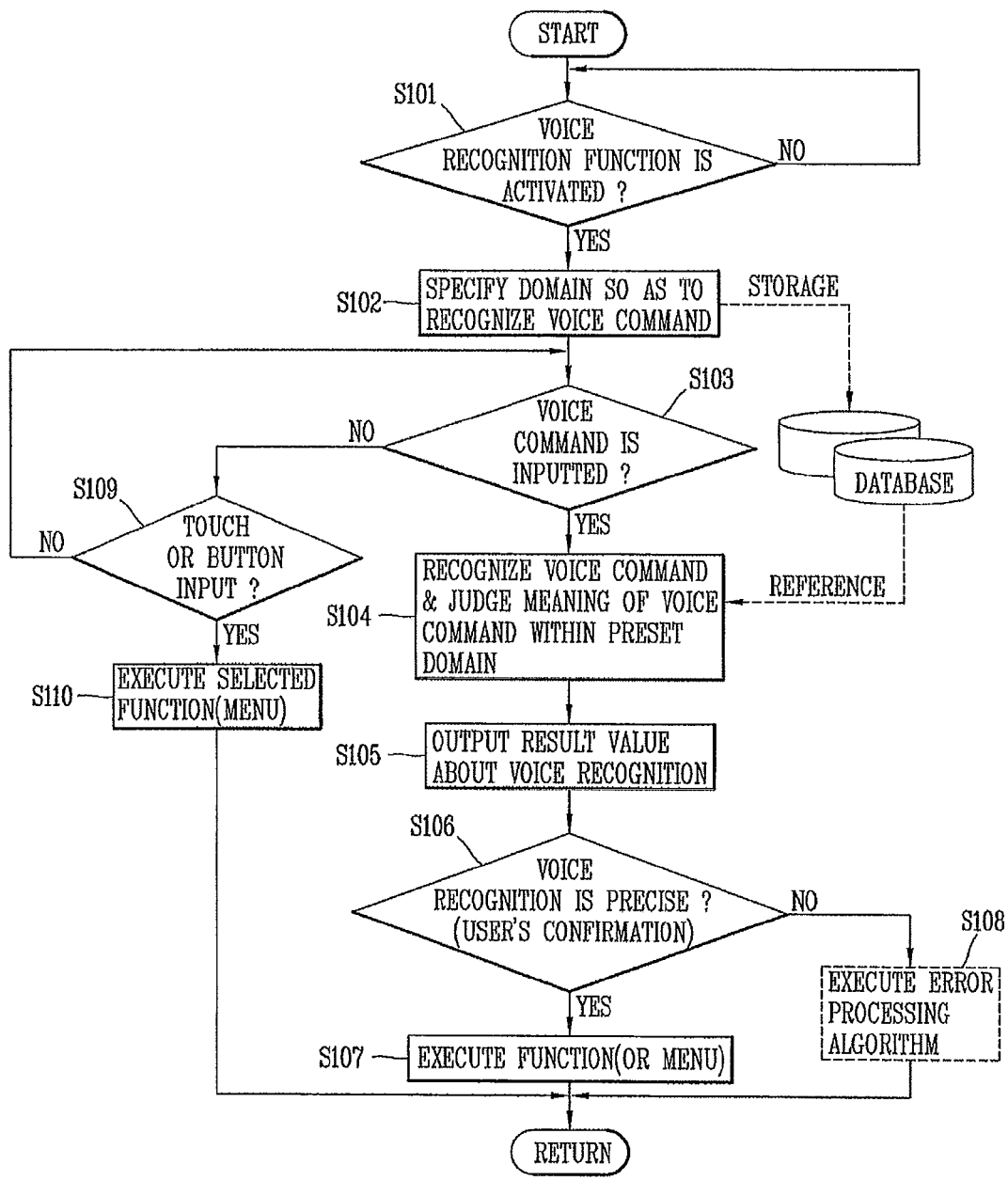
FIG. 5 is a flowchart illustrating a menu voice control method in a mobile terminal according to an embodiment of the present invention.

Next, FIG. 5 is a flowchart illustrating a menu voice control method for a mobile terminal according to an embodiment of the present invention. As shown in FIG. 5, the controller 180 determines if the voice recognition function has been activated (S101). Further, the voice recognition function may be activated by the user selecting hardware buttons on the mobile terminal, or soft touch buttons displayed on the display 151. The user may also activate the voice recognition function by manipulating specific menus displayed on the display 151, by generating a specific sound or sound effects, by short or long-range wireless signals, or by the user's body information such as hand gesture or body gesture.

In more detail, the specific sound or sound effects may include impact sounds having a level more than a specific level. Further, the specific sound or sound effects may be detected using a sound level detecting algorithm. In addition, the sound level detecting algorithm is preferably simpler than a voice recognition algorithm, and thus consumes less resources of the mobile terminal. Also, the sound level detecting algorithm (or circuit) may be individually implemented from the voice recognition algorithm or circuit, or may be implemented so as to specify some functions of the voice recognition algorithm. In addition, the wireless signals may be received through the wireless communication unit 110, and the user's hand or body gestures may be received through the sensing unit 140. Thus, in an embodiment of the present invention, the wireless communication unit 110, the user input unit 130, and the sensing unit 140 may be referred to as a signal input unit. Further, the voice recognition function may also be terminated in a similar manner.

Having the user physically activate the voice recognition function is particularly advantageous, because the user is more aware they are about to use voice commands to control the terminal. That is, because the user has to first perform a physical manipulation of the terminal, he or she intuitively recognizes they are going to input a voice command or instruction into the terminal, and therefore speak more clearly or slowly to thereby activate a particular function. Thus, because the user speaks more clearly or more slowly, for example, the probability of accurately recognizing the voice instruction increases. That is, in an embodiment of the present invention, the activation of the voice recognition function is performed by a physical manipulation of a button on the terminal, rather than activating the voice recognition function by speaking into the terminal.

Further, the controller 180 may start or terminate activation of the voice recognition function based on how many times the user touches a particular button or portion of the touch screen, how long the user touches a particular button or portion of the touch screen, etc. The user can also set how the controller 180 is to activate the voice recognition function using an appropriate menu option provided by the present invention. For example, the user can select a menu option on the terminal that includes 1) set activation of voice recognition based on X number of times the voice activation button is selected, 2) set activation of voice recognition based on X amount of time the voice activation button is selected, 3) set activation of voice recognition when the buttons X and Y are selected, etc. The user can then enter the values of X and Y in order to variably set how the controller 180 determines the voice activation function is activated. Thus, according to an embodiment of the present invention, the user is actively engaged with the voice activation function of their own mobile terminal, which increases the probability that the controller 180 will determine the correct function corresponding to the user's voice instruction, and which allows the user to tailor the voice activation function according to his or her needs.

The controller 180 may also maintain the activated state of the voice recognition function while the designated button(s) are touched or selected, and stop the voice recognition function when the designated button(s) are released. Alternatively, the controller 180 can maintain the activation of the voice recognition function for a predetermined time period after the designated button(s) are touched or selected, and stop or terminate the voice recognition function when the predetermined time period ends. In yet another embodiment, the controller 180 can store received voice instructions in the memory 160 while the voice recognition function is maintained in the activated state.

In addition, as shown in FIG. 5, a domain of the database used as a reference for recognizing the meaning of the voice command is specified to information relating to specific functions or menus on the terminal (S102). For instance, the specified domain of database may be information relating to menus currently displayed on the display 151, or information relating to sub-menus of one of the displayed menus. Further, because the domain of database is specified, the recognition rate for the input voice command is improved. Examples of domains include an e-mail domain, a received calls domain, and multimedia domain, etc.

Also, the information relating to sub-menus may be configured as data in a database. For example, the information may be configured in the form of a keyword, and a plurality of information may correspond to one function or menu. In addition, the database can be a plurality of databases according to features of information, and may be stored in the memory 160. Further, the information in the database(s) may be advantageously updated or renewed through a learning process. Each domain of the respective databases may also be specified into a domain relating to functions or menus being currently output, so as to enhance a recognition rate for a voice command. The domain may also change as menu steps continue to progress.

Once the voice recognition function is activated (Yes in S101) and the domain has been specified (S102), the controller 180 determines if the user has input a voice command (S103). When the controller 180 determines the user has input the voice command (Yes in S103), the controller 180 analyzes a context and content of a voice command or instruction input through the microphone 122 based on a specific database, thereby judging a meaning of the voice command (S104).

Further, the controller 180 can determine the meaning of the voice instruction or command based on a language model and an acoustic model of the accessed domain. In more detail, the language model relates to the words themselves and the acoustic model corresponds to the way the words are spoken (e.g., frequency components of the spoken words or phrases). Using the language and acoustic models together with a specific domain and a state of the mobile terminal 100, the controller 180 can effectively determine the meaning of the input voice instructions or command.

Further, the controller 180 may immediately start the process for judging the meaning of the input voice command when the user releases the activation of the voice recognition function when the controller 180 stores the input voice command in the memory 160, or may simultaneously perform the voice activation function when the voice command is input. In addition, if the voice command has not been fully input (No in S103), the controller 180 can still perform other functions. For example, if the user performs another action by touching a menu option, etc. or presses a button on the terminal (Yes in S109), the controller 180 performs the corresponding selected function (S110).

Further, after the controller 180 determines the meaning of the input voice command in step S104, the controller 180 outputs a result value of the meaning (S105). That is, the result value may include control signals for executing menus relating to functions or services corresponding to the determined meaning, for controlling specific components of the mobile terminal, etc. The result value may also include data for displaying information relating to the recognized voice command.

The controller 180 may also request the user confirm the output result value is accurate (S106). For instance, when the voice command has a low recognition rate or is determined to have a plurality of meanings, the controller 180 can output a plurality of menus relating to the respective meanings, and then execute a menu that is selected by the user (S107). Also, the controller 180 may ask a user whether to execute a specific menu having a high recognition rate, and then execute or display a corresponding function or menu according to the user's selection or response.

In addition, the controller 180 can also output a voice message asking the user to select a particular menu or option such as "Do you want to execute a message composing function? Reply with Yes or No." Then, the controller 180 executes or does not execute a function corresponding to the particular menu or option based on the user's response. If the user does not respond in a particular time period (e.g., five seconds), the controller 180 can also immediately execute the particular menu or option. Thus, if there is no response from the user, the controller 180 may automatically execute the function or menu by judging the non-response as a positive answer. That is, the error processing step may be performed (S108) by again receiving input of a voice command, or may be performed by displaying a plurality of menus having a recognition rate more than a certain level or a plurality of menus that may be judged to have similar meanings. The user can then select one of the plurality of menus. Also, when the number of functions or menus having a recognition rate more than a certain level is less than a preset number (e.g., two), the controller 180 can automatically execute the corresponding function or menu.

Next, FIG. 6A is an overview showing a method for activating a voice recognition function for a mobile terminal according to an embodiment of the present invention. As shown in the display screen 410, the user can activate the voice recognition function by touching a soft button 411. The user can also terminate the voice recognition function by releasing the soft button 411. In more detail, the user can activate the voice recognition function by touching the soft button 411 and continuously touch the soft button 411 or hard button 412, until the voice instruction has been completed. That is, the user can release the soft button 411 or hard button 412 when the voice instruction has been completed. Thus, the controller 180 is made aware of when the voice instruction is to be input and when the voice instruction has been completed. As discussed above, because the user is directly involved in this determination, the accuracy of the interpretation of the input voice command is increased.

The controller 180 can also be configured to recognize the start of the voice activation feature when the user first touches the soft button 411, and then recognize the voice instruction has been completed when the user touches the soft button 411 twice, for example. Other selection methods are also possible. Further, as shown in the display screen 410 in FIG. 6A, rather than using the soft button 411, the voice activation and de-activation can be performed by manipulating the hard button 412 on the terminal.

In addition, the soft button 411 shown in the display screen 410 can be a single soft button that the user presses or releases to activate/deactivate the voice recognition function or may be a menu button that when selected produces a menu list such as "1. Start voice activation, and 2. Stop voice activation". The soft button 411 can also be displayed during a standby state, for example. In another example, and as shown in the display screen 420, the user can also activate and deactivate the voice recognition function by touching an arbitrary position of the screen. The display screen 430 in FIG. 6A illustrates yet another example in which the user activates and deactivates the voice recognition function by producing a specific sound or sound effects that is/are greater than a specific level. For example, the user may clap their hands together to produce such an impact sound.

Thus, according to an embodiment of the present invention, the voice recognition function may be implemented in two modes. For example, the voice recognition function may be implemented in a first mode for detecting a particular sound or sound effects more than a certain level, and in a second mode for recognizing a voice command and determining a meaning of the voice command. If the sound or sound effects is/are more than a certain level in the first mode, the second mode is activated to thereby to recognize the voice command.

The display screen 440 in FIG. 6A illustrates still another method of the user activating and deactivating the voice recognition function. In this example, the controller 180 is configured to interpret body movements of the user to start and stop the voice activation function. For example, and as shown in the display screen 440, the controller 180 may be configured to interpret the user moving his hand toward the display as an instruction to activate the voice recognition function, and the user moving his hand away from the display as an instruction to terminate the voice activation function. Short or long-range wireless signals may also be used to start and stop the voice recognition function.

Thus, according to an embodiment of the present invention, because the voice activation function is started and stopped, the voice recognition function is not continuously executed. That is, when the voice recognition function is continuously maintained in the activated state, the amount of resources on the mobile terminal is increased compared to the embodiment of the present invention. Further, as discussed above with respect to FIG. 5, when the voice recognition function is activated, the controller 180 specifies a domain of a specific database that is used as a reference for voice command recognition into a domain relating to a menu list on the display 151. Then, if a specific menu is selected or executed from the menu list, the domain of the database may be specified into information relating to the selected menu or sub-menus of the specific menu.

Figure 6B:
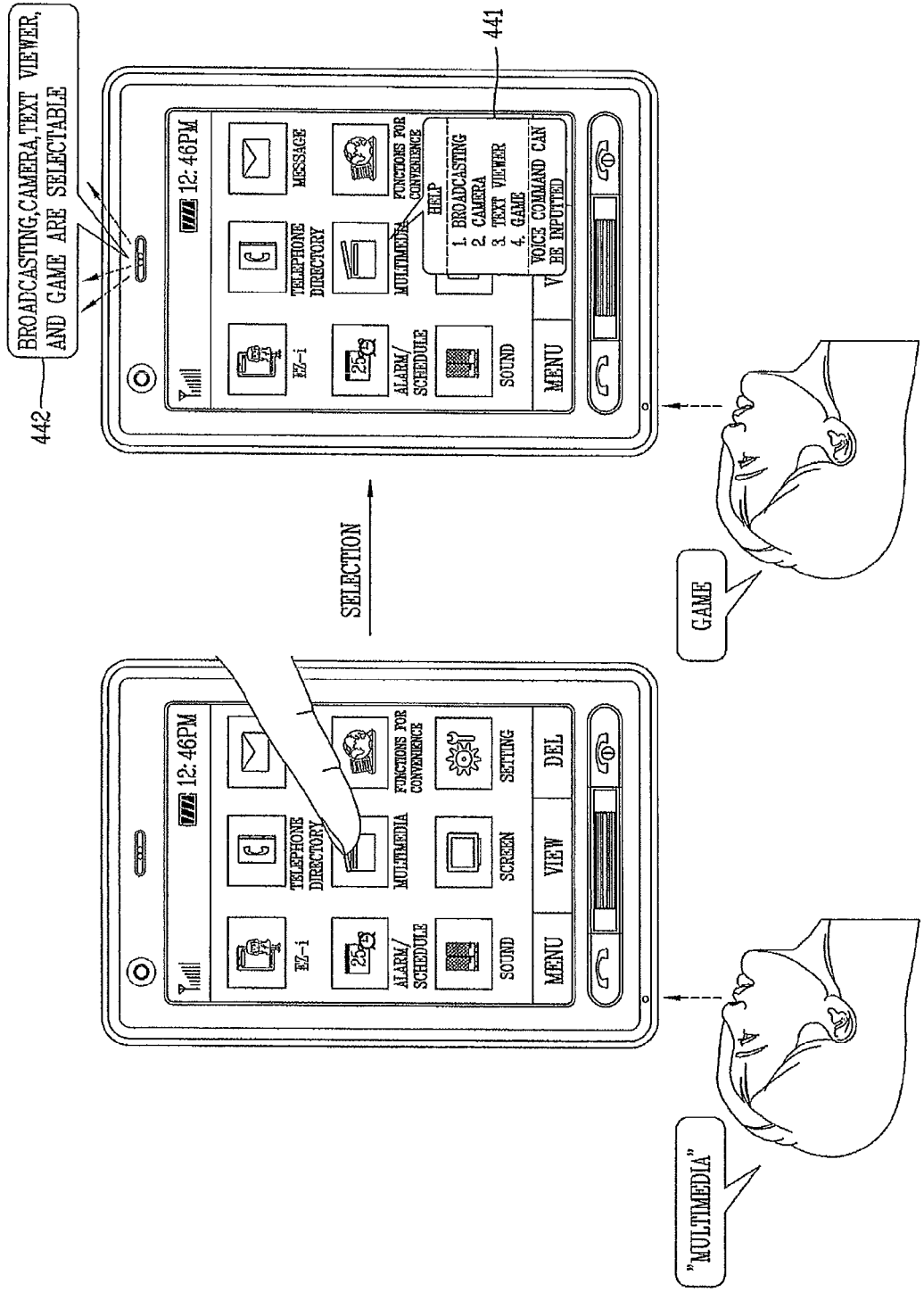
FIGS. 6B and 6C include overviews of display screens illustrating a method for outputting help information in a mobile terminal according to an embodiment of the present invention.
Figure 6C:
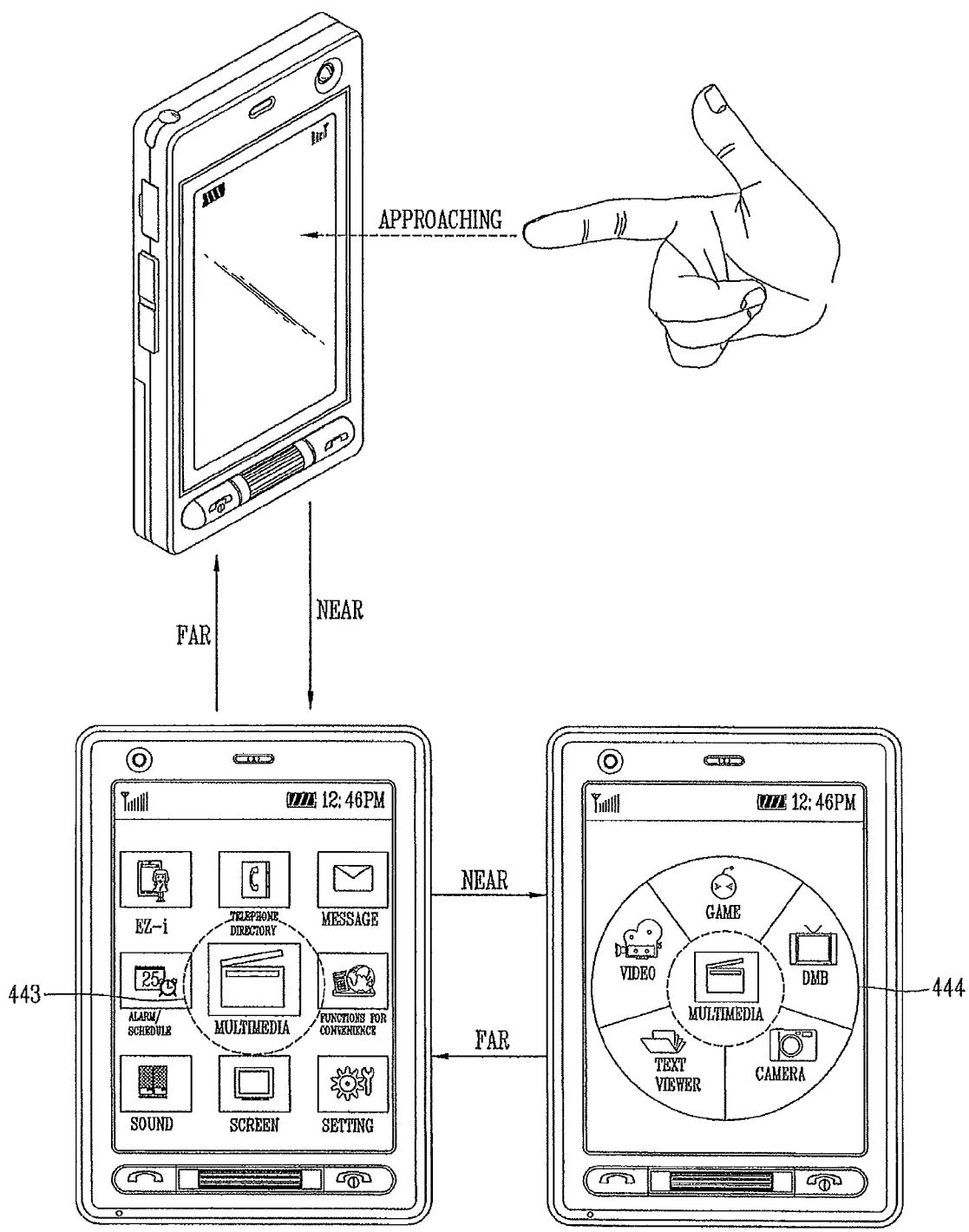

In addition, when the specific menu is selected or executed through a voice command or touch input, the controller 180 may output help information relating to sub-menus of the specific menu in the form of a voice message, or pop-up windows or balloons. For example, as shown in FIG. 6B, when the user selects the 'multimedia menu' via a touching or voice operation, the controller 180 displays information relating to the sub-menus (e.g., broadcasting, camera, text viewer, game, etc.) of the 'multimedia menu' as balloon-shaped help information 441. Alternatively, the controller 180 can output a voice signal 442 including the help information. The user can then select one of the displayed help options using a voice command or by a touching operation FIG. 6C illustrates an embodiment of a user selecting a menu item using his or her body movements (in this example, the user's hand gesture). In more detail, as the user moves his or her finger closer to the menu item 443, the controller 180 displays the sub-menus 444 related to the menu 443. The controller 180 can recognize the user's body movement of information via the sensing unit 140, for example. In addition, the displayed help information can be displayed so as to have a transparency or brightness controlled according to the user's distance. That is, as the user's hand gets closer, the displayed items can be further highlighted.

As discussed above, the controller 180 can be configured to determine the starting and stopping of the voice recognition function based on a variety of different methods. For example, the user can select/manipulate soft or hard buttons, touch an arbitrary position on the touch screen, etc. The controller 180 can also maintain the activation of the voice recognition function for a predetermined amount of time, and then automatically end the activation at the end of the predetermined amount of time. Also, the controller 180 may maintain the activation only while a specific button or touch operation is performed, and then automatically end the activation when the input is released. The controller 180 can also end the activation process when the voice command is no longer input for a certain amount of time.

Figure 7A:
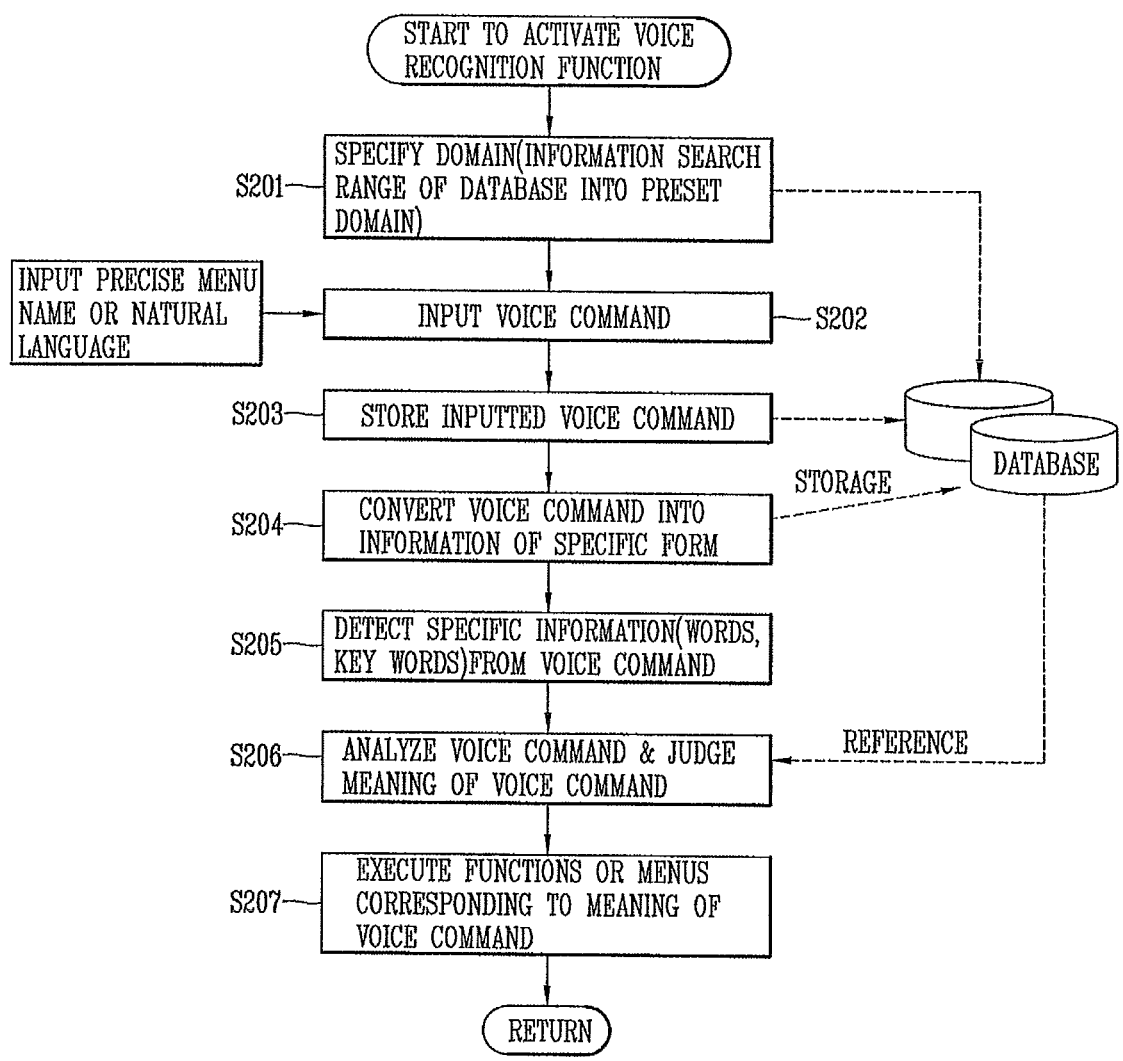
FIG. 7A is a flowchart illustrating a method for recognizing a voice command in a mobile terminal according to an embodiment of the present invention.

Next, FIG. 7A is a flowchart showing a method for recognizing a voice command in a mobile terminal according to an embodiment of the present invention. Referring to FIG. 7A, when the voice recognition function is activated, the controller 180 specifies a domain of a database that can be used as a reference for voice command recognition into a domain relating to a menu displayed on the display 151, sub-menus of the menu, or a domain relating to a currently-executed function or menu (S201). The user also inputs the voice command (S202) using either the precise menu name or using a natural language (spoken English, for example). The controller 180 then stores the input voice command in the memory 160 (S203). Further, when the voice command is input under a specified domain, the controller 180 analyzes a context and content of the voice command based on the specified domain by using a voice recognition algorithm. Also, the voice command may be converted into text-type information for analysis (S204), and then stored in a specific database of the memory 160. However, the step of converting the voice command into text-type information can be omitted.

Then, to analyze the context and content of the voice command, the controller 180 detects a specific word or keyword of the voice command (S205). Based on the detected words or keywords, the controller 180 analyzes the context and content of the voice command and determines or judges a meaning of the voice command by referring to information stored in the specific database (S206). In addition, as discussed above, the database used as a reference includes a specified domain, and functions or menus corresponding to a meaning of the voice command judged based on the database are executed (S207). For example, if it is assumed that text is input using a STT function after executing the text message writing function, the priorities of such information for the voice command recognition may be set to commands related to modifying text or commands related to searching for another party to receive the text message or transmission of such message. Also, because the database for voice recognition is specified to each information relating to a currently-executed function or menu, the recognition rate and speed for of recognizing the voice command are improved, and the amount of resources used on the terminal is reduced. Further, the recognition rate indicates a matching degree with a name preset to a specific menu.

The recognition rate for an input voice command may also be judged by the number of information relating to specific functions or menus of the voice command. Therefore, the recognition rate for the input voice command is improved when the information precisely matches a specific function or menu (e.g., menu name) that is included in the voice command.

Figure 7B:
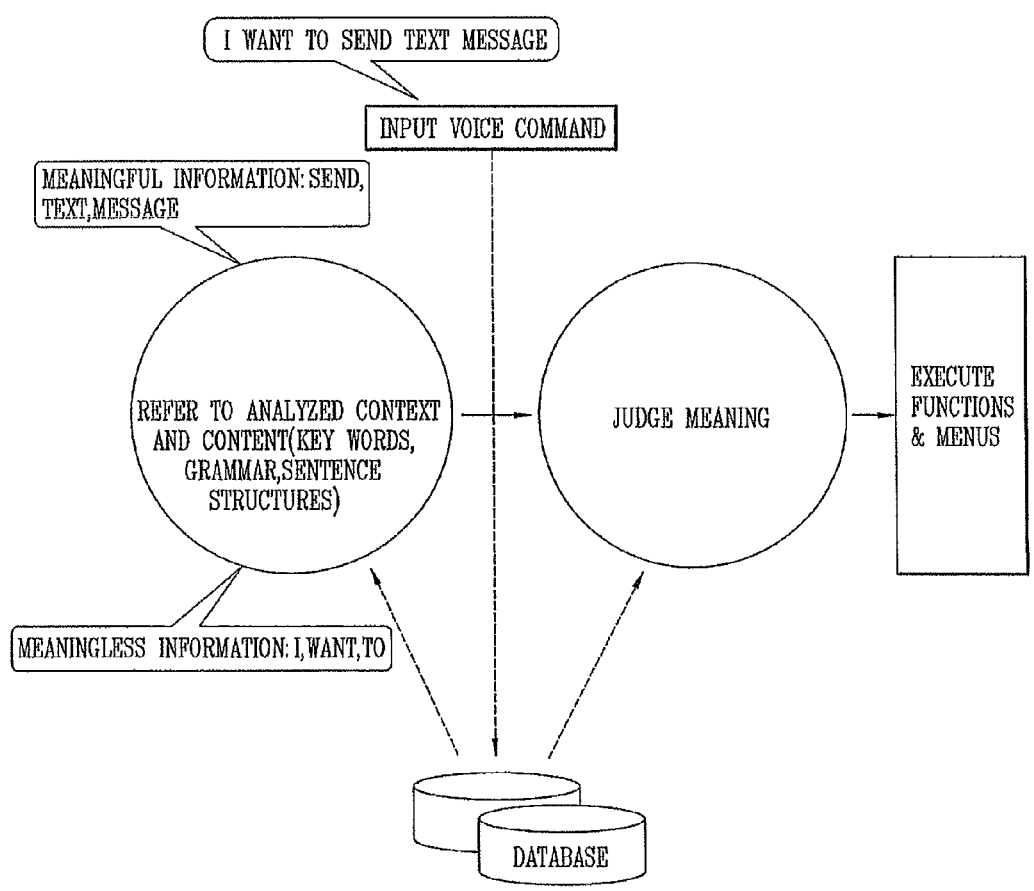
FIG. 7B is an overview illustrating a method for recognizing a voice command in a mobile terminal according to an embodiment of the present invention.

In more detail, FIG. 7B is an overview showing a method for recognizing a voice command of a mobile terminal according to an embodiment of the present invention. As shown in FIG. 7B, the user inputs a voice command as a natural language composed of six words "I want to send text message." In this example, the recognition rate can be judged based on the number of meaningful words (e.g., send, text, message) relating to a specific menu (e.g., text message). In addition, the controller 180 can determine whether the words included in the voice command are meaningful words relating to a specific function or menu based on the information stored in the database. For instance, meaningless words included in the natural language voice command (e.g., I want to send text message) that are irrelevant to the specific menu may be the subject (I) or the preposition (to).

Also, the natural language is a language commonly used by people, and has a concept contrary to that of an artificial language. Further, the natural language may be processed by using a natural language processing algorithm. The natural language may or may not include a precise name relating to a specific menu, which sometimes causes a difficulty in completely precisely recognizing a voice command. Therefore, according to an embodiment of the present invention, when a voice command has a recognition rate more than a certain level (e.g., 80%), the controller 180 judges the recognition to be precise. Further, when the controller 180 judges a plurality of menus to have similar meanings, the controller 180 displays the plurality of menus and the user can select one of the displayed menus to have its functions executed. In addition, a menu having a relatively higher recognition rate may be displayed first or distinctively displayed compared to the other menus.

Figure 8:
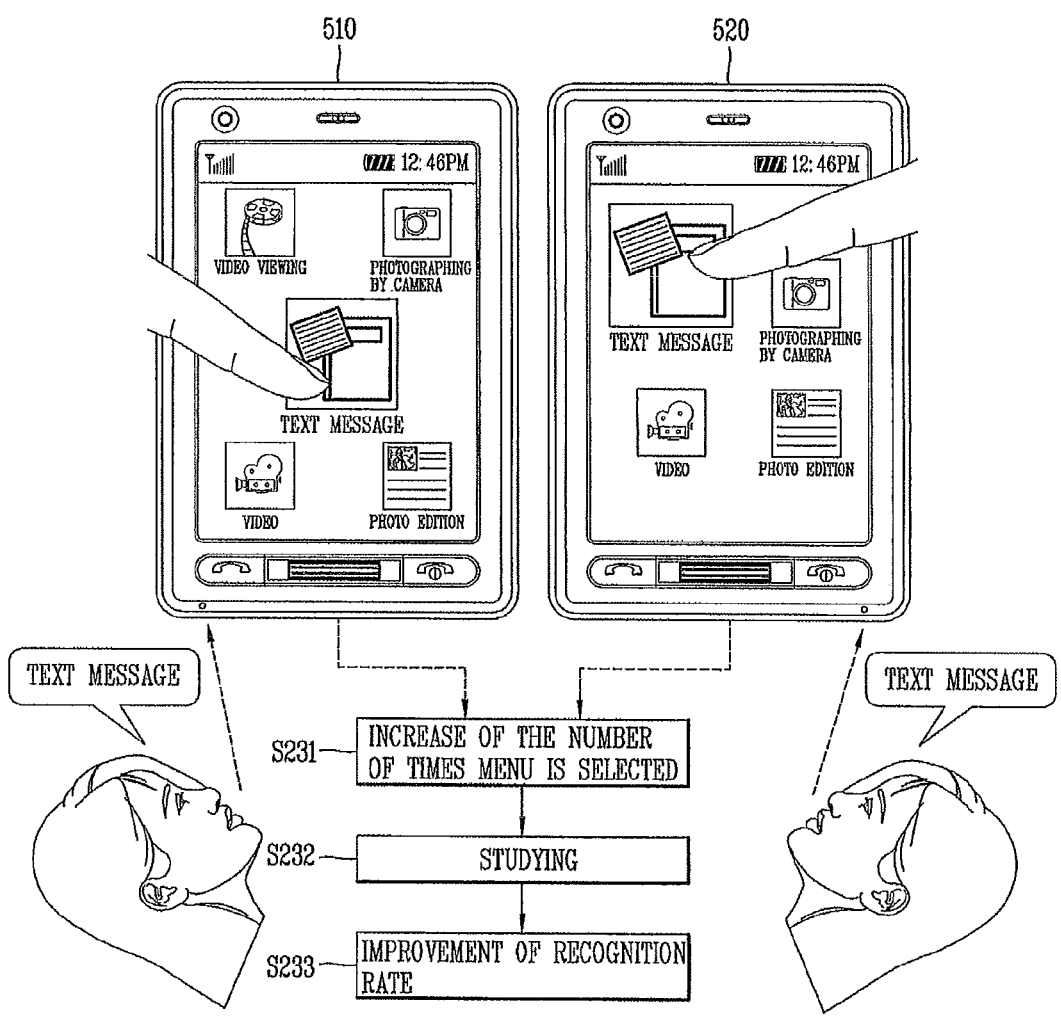
FIG. 8 includes overviews of display screens illustrating a method for displaying a menu in cooperation with a rate of voice recognition in a mobile terminal according to an embodiment of the present invention.

For example, FIG. 8 is an overview showing a method for displaying menus for a voice recognition rate of a mobile terminal according to an embodiment of the present invention. As shown in FIG. 8, a menu icon having a higher recognition rate is displayed at a central portion of the display screen 510, or may be displayed with a larger size or a darker color as shown in the display screen 520. The menu icon having the higher recognition rate can also be displayed first and then followed in order or sequential manner by lower recognition rate menus. Further, the controller 180 can distinctively display the plurality of menus by changing at least one of the size, position, color, brightness of the menus or by highlighting in the order of a higher recognition rate. The transparency of the menus may also be appropriately changed or controlled.

In addition, as shown in the lower portion of FIG. 8, a menu having a higher selection rate by a user may be updated or set to have a recognition rate. That is, the controller 180 stores a history of the user selections (S231) and performs a learning process (S232) to thereby update a particular recognition rate for a menu option that is selected by a user more than other menu options (S233). Thus, the number of times a frequently used menu is selected by a user may be applied to recognition rate of the menu. Therefore, a voice command input in the same or similar manner in pronunciation or content may have a different recognition rate according to how many times a user selects a particular menu. Further, the controller 180 may also store time at which the user performs particular functions. For example, a user may check emails or missed messages every time they wake up on Mondays through Fridays. This time information may also be used to improve the recognition rate. The state of the terminal (e.g., standby mode, etc.) may also be used to improve the recognition rate. For example, the user may check emails or missed messages when first turning on their mobile terminal, when the terminal is opened from a closed position, etc.

Figure 9:
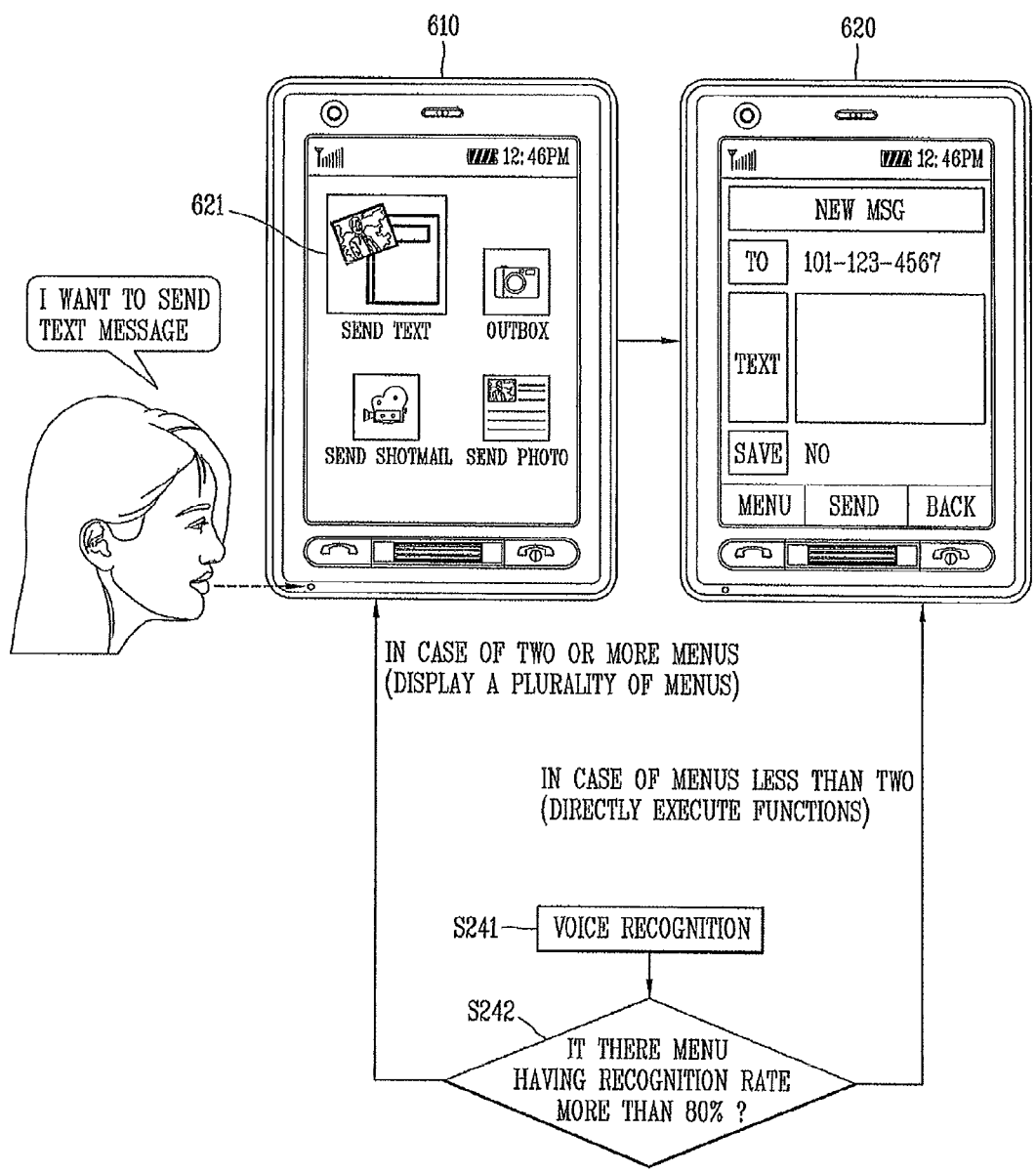
FIG. 9 includes overviews of display screens illustrating a method for recognizing a voice command in a mobile terminal according to an embodiment of the present invention.

Next, FIG. 9 is an overview showing a method for recognizing a voice command of a mobile terminal according to another embodiment of the present invention. As shown in FIG. 9, the user activates the voice recognition function, and inputs the voice command "I want to send text message." The controller 180 then specifies a domain of a database for voice command recognition into a domain relating to the displayed sub-menus. The controller 180 then interprets the voice command (S241) and in this example, displays a plurality of menus that have a probability greater than a particular value (e.g., 80%) (S242). As shown in the display screen 610 in FIG. 9, the controller displays four multimedia menus.

The controller 180 also distinctively displays a menu having the highest probability (e.g., specific menu option 621 "Send Text" in this example). The user can then select any one of the displayed menus to execute a function corresponding to the selected menu. In the example shown in FIG. 9, the user selects the Send Text menu option 621 and the controller 180 displays sub menus related to the selected Send Text menu option 621 as shown in the display screen 620. Also, as shown in step (S242) in the lower portion of FIG. 9, the controller 180 can also immediately execute a function when only a single menu is determined to be higher than the predetermined probability rate. That is, the controller 180 displays the information related to the text sending as shown in the display screen 620 immediately without the user having to select the Send Text menu option 621 when the Send Text menu option 621 is determined to be the only menu that has a higher recognition rate or probability than a predetermined threshold.

Further, as discussed above with respect to FIG. 6B, when a specific menu is selected or executed through a voice command or touch input according to an operation state or mode (e.g., a mode for indicating a voice recognition function), the controller 180 can also output balloon-shaped help information related to the sub menus to the user in a voice or text format. In addition, the user can set the operation mode for outputting the help using appropriate menu options provided in environment setting menus. Accordingly, a user can operate the terminal of the present invention without needing or having a high level of skill. That is, many older people may not be experienced in operating the plurality of different menus provided with terminal. However, with the terminal of the present invention, a user who is generally not familiar with the intricacies of the user interfaces provided with the terminal can easily operate the mobile terminal.

In addition, when the controller 180 recognizes the voice command to have a plurality of meanings (i.e., when a natural language voice command (e.g., I want to send text message) does not include a precise menu name such as when a menu is included in a 'send message' category but does not have a precise name among 'send photo', 'send mail', and 'outbox'), the controller 180 displays a plurality of menus having a recognition rate more than a certain value (e.g. 80%).

Figure 10:
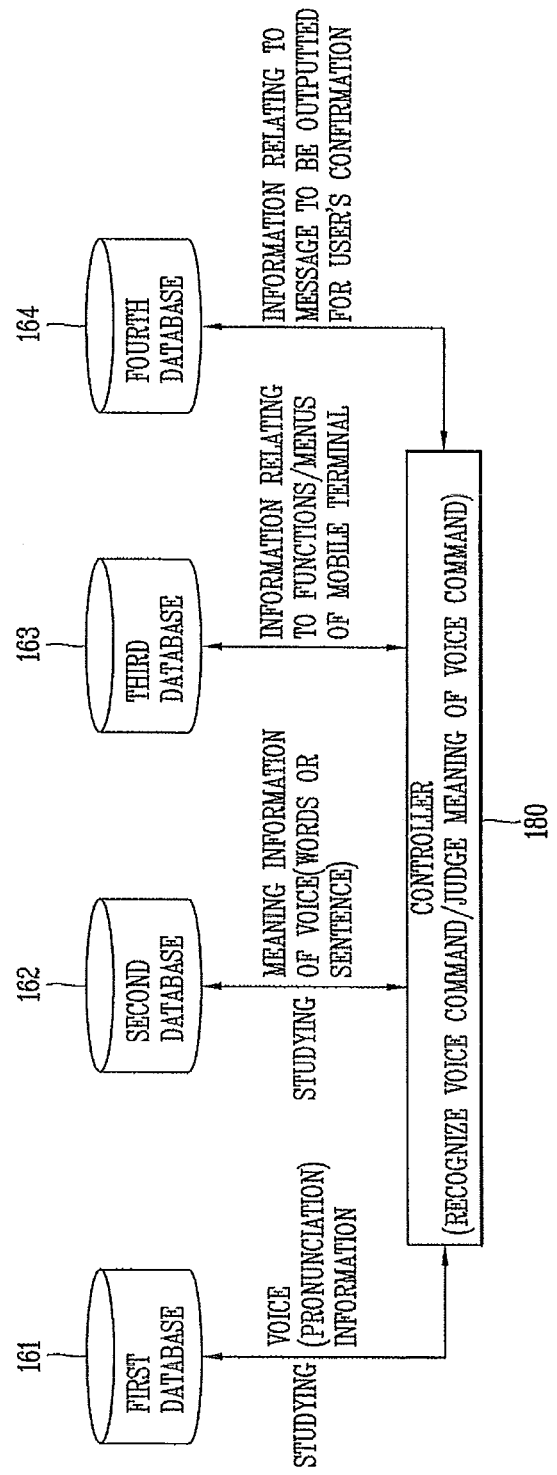
FIG. 10 is an overview illustrating an organization of databases used for recognizing a voice command in a mobile terminal according an embodiment of the present invention.

Next, FIG. 10 is an overview showing a plurality of databases used by the controller 180 for recognizing a voice command of a mobile terminal according to an embodiment of the present invention. In this embodiment, the databases store information that the controller 180 uses to judge a meaning of a voice command, and may be any number of databases according to information features. Further, the respective databases configured according to information features may be updated through a continuous learning process under control of the controller 180. For example, the learning process attempts to match a user's voice with a corresponding word.

For example, when a word "waiting" pronounced by a user is misunderstood as a word "eighteen", the user corrects the word "eighteen" into "waiting". Accordingly, the same pronunciation to be subsequently input by the user is made to be recognized as "waiting".

As shown in FIG. 10, the respective databases according to information features include a first database 161, a second database 162, a third database 163, and a fourth database 164. In this embodiment, the first database 161 stores voice information for recognizing a voice input through the microphone in units of phonemes or syllables, or morphemes. The second database 162 stores information (e.g., grammar, pronunciation precision, sentence structure, etc.) for judging an entire meaning of a voice command based on the recognized voice information. The third database 163 stores information relating to menus for functions or services of the mobile terminal, and the fourth database 164 stores a message or voice information to be output from the mobile terminal so as to receive a user's confirmation about the judged meaning of the voice command In addition, the third database 163 may be specified into information relating to menus of a specific category according to a domain preset for voice command recognition. Also, the respective database may store sound (pronunciation) information, and phonemes, syllable, morphemes, words, keywords, or sentences corresponding to the pronunciation information. Accordingly, the controller 180 can determine or judge the meaning of a voice command by using at least one of the plurality of databases 161 to 164, and execute menus relating to functions or services corresponding to the judged meaning of the voice command. Further, the present invention can display an operation state or mode having the voice command recognition function or STT function applied thereto by using a specific shape of indicator or icon. Then, upon the output of the indicator or icon, the user can be notified through a specific sound or voice.

Next, a method for controlling a mobile terminal according to an embodiment of the present invention will be explained. The discussed embodiments may be used independently or in combination with each other, and/or in combination with the user interface (UI). In addition, the mobile terminal according to an embodiment of the present invention includes a web browser function and is configured to access the wireless Internet. When the web browser is executed, the controller 180 displays a default web page (hereinafter, will be referred to as 'home page') that has been previously set in an environment setting option. Then, the user can open either a web page of an address directly input in an address window of the web browser, or a web page of an address registered as a bookmark. When the web page corresponds to a separate popup window, the popup window is displayed on an upper layer of the main web page.

Figure 11:
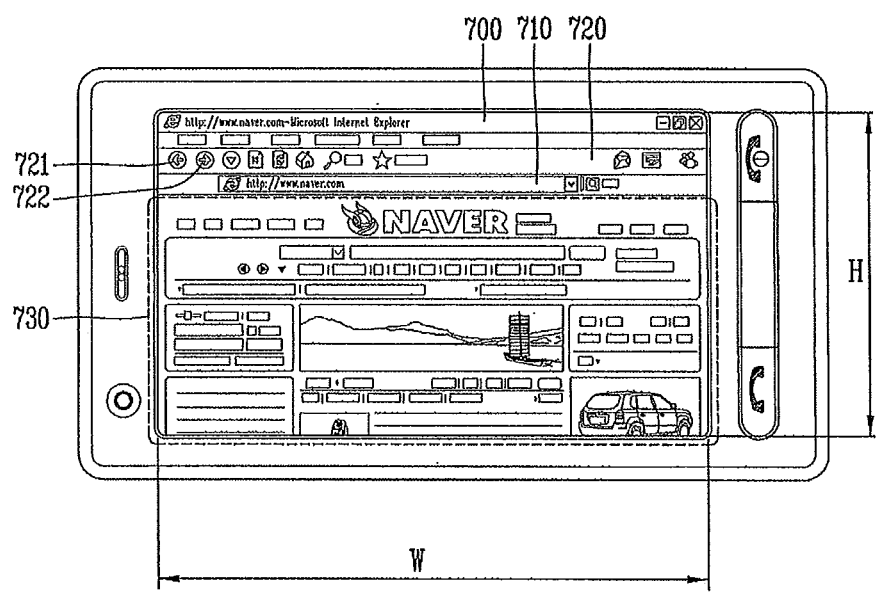
FIG. 11 is an overview showing a web browser of a mobile terminal according to an embodiment of the present invention.

For example, FIG. 11 is an overview showing a web browser 700 of a mobile terminal according to an embodiment of the present invention. As shown, the web browser 700 includes an address input window 710 for inputting an address of a web page, and a plurality of function button regions 720 used to perform a web surfing operation. Further, the function button regions 720 include a previous button 721 for displaying a previously opened web page (e.g., a first web page) of a currently opened web page (e.g., a second web page), and a back button 722 for displaying a subsequently opened web page (e.g., a third web page) of the currently opened web page. A home button, favorites button, refresh button, etc. may also be included in this region.

In addition, a web page generally has a resolution of at least 800 pixels in a horizontal direction. Therefore, the mobile terminal includes a display module also having a resolution of 800 pixels in a horizontal direction so as to provide full browsing capabilities. However, the display module of the mobile terminal includes at most 450 pixels in a vertical direction, which is less than those of a general monitor. Therefore, to view the information on a mobile terminal, the user must often scroll down or up to view more information beyond the displayed 450 vertical pixels displayed in the vertical direction. In addition, one problem that may occur while performing a full web browsing function is that a screen size of the terminal is too small when compared with a resolution. Therefore, the webpage and corresponding information are displayed with a small font and are difficult to read and select. When the display is a touch screen, the user can touch a particular link or item to obtain more information about the selected link or item, but because the information is displayed with a small size, the user often touches the wrong link or item.

For example, if the user is viewing a main webpage about football, the user can view multiple links about different football news (e.g., different teams, live scores, etc.). The user can then touch a particular link to view more information about the selected link. However, because the display size of the terminal is so small, the links and other webpage information are condensed and displayed very close together. Thus, the user often inadvertently touches the wrong link. This is particularly disadvantageous because the wrong additional information is accessed, which can take some time in a poor wireless environment, and if the user tries pressing the back page button, the main web page tends to freeze and the user must completely restart the web access function.

In addition, when the weather is cold, the user often tries to touch a web link or other related web item while wearing gloves. However, because the touch screen is limited to recognizing only the user's finger, the user must take off their gloves to operate the touch screen terminal. This is particular disadvantageous especially in cites where the weather is quite cold in the Winter. The touch screen may also be configured to recognize a touch from a stylus or other related touch pen. However, it is inconvenient for the user to retract the stylus and then touch an item. The stylus is often misplaced or lost, resulting in even more inconvenience for the user. Further, the user often wants to search for information using the web browsing function on the mobile terminal. However, because the screen is so small and because the keypad used for inputting the search information is also small, it is very difficult for the user to input search commands. The present invention solves the above problems by providing a method for facilitating an information search process in a web browsing mode not only through a touch input, but also through a voice command. In more detail, FIG. 12 is a flowchart showing a method for searching information through a voice command in a web browsing mode according to an embodiment of the present invention.

In addition, as discussed above, the mobile terminal of the present invention may access a web page through the wireless Internet. That is, as shown in FIG. 11, the controller 180 can access the wireless Internet by using the wireless communication unit 110, and display the web page on a preset region (web page display region) 730 of a web browser (S301 in FIG. 12). Further, when the web browser is executed, the controller 180 can automatically activate a voice recognition function and an STT function. The controller 180 also constructs objects of the displayed web page (e.g., text, images, windows, etc.) as a database. In more detail, the database may include a plurality of databases according to the types of web pages, and may be stored in the memory 160. The objects of the database may be specified into objects displayed on a screen. Also, when the web page is enlarged or reduced in size according to a user's instruction, the controller 180 can appropriately reconfigure the database. Therefore, the controller 180 can recognize user voice commands based on the information of the objects of the database.

Figure 12:
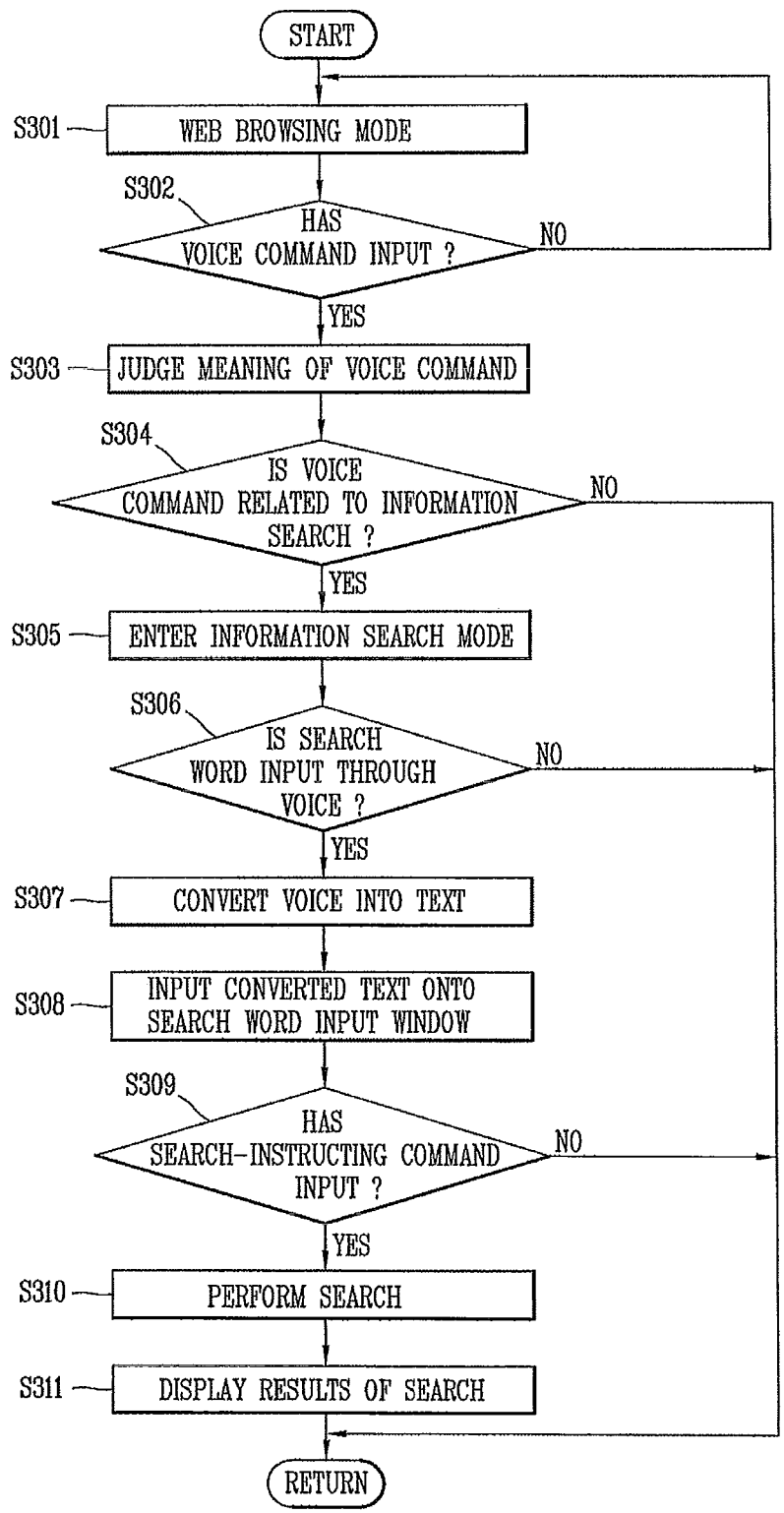
FIG. 12 is a flowchart showing a method for searching information through a voice command in a web browsing mode according to an embodiment of the present invention.

Accordingly, as shown in FIG. 12, when the user inputs a voice command in a web browsing mode (Yes in S302), the controller 180 judges or determines a meaning of the voice command (S303). That is, the controller 180 converts the voice command into text using an STT function, and judges the meaning of the voice command based on the converted text. For example, the controller 180 can refer to the database constructed with object information of the web page order to determine the meaning of the voice command. In addition, the user can input the voice command in the form of names (titles) of objects or phrases or sentences including the names of the objects. The user can also enlarge a portion of the webpage before issuing the voice command to have the controller 180 more easily judge the meaning of the voice command, to improve a recognition rate for the voice command, to more specifically specify a scope of an object to be recognized in the voice command manner, etc.

Then, as shown in FIG. 12, if the controller 180 determines the input voice command has a meaning relating to an information search operation in the web browsing mode (Yes in S304), the controller 180 enters an information search mode (S305). In addition, the information search mode indicates a mode for searching information relating to a search word input into a search word input window of a web page having an information search function. The information search mode may also indicate a mode for searching contents included in a currently displayed web page.

After entering the information search mode, the controller 180 may display information about the entered state. Accordingly, a user can recognize that the mobile terminal has entered an information search mode, and can then input search information. Further, the user can input the search information in the form of words, phrases, or sentences. The user can input the search information by manually typing the information or by inputting the search information using voice commands. When the user inputs the search information via a voice command (Yes in S306), the controller 180 converts the voice command into a text using an STT function (S307). The controller 180 can also automatically display the converted text on the search word input window (S308).

In addition, the controller 180 may output a guide message relating to an operation state of the mobile terminal. For instance, the guide message may be a message indicating that the mobile terminal has entered an information search mode, a message indicating that a search word can be input, or a message confirming whether an input search word is correct, etc. Then, when the user inputs a search instruction command (Yes in S309), the controller 180 performs the information search operation (S310). Also, the search operation is generally not performed by the mobile terminal, but rather upon indication of a search operation, the controller 180 sends a search word and a search instruction to a web server, and receives results about the search word from the web server. The controller 180 then displays the results (S311). Further, when the searched information is displayed in the form of a web page via the controller 180, the user can select any one of searched objects displayed on the web page in a voice command manner or in a key or touch input manner. Accordingly, detailed contents of the information can be displayed.

Figure 13:
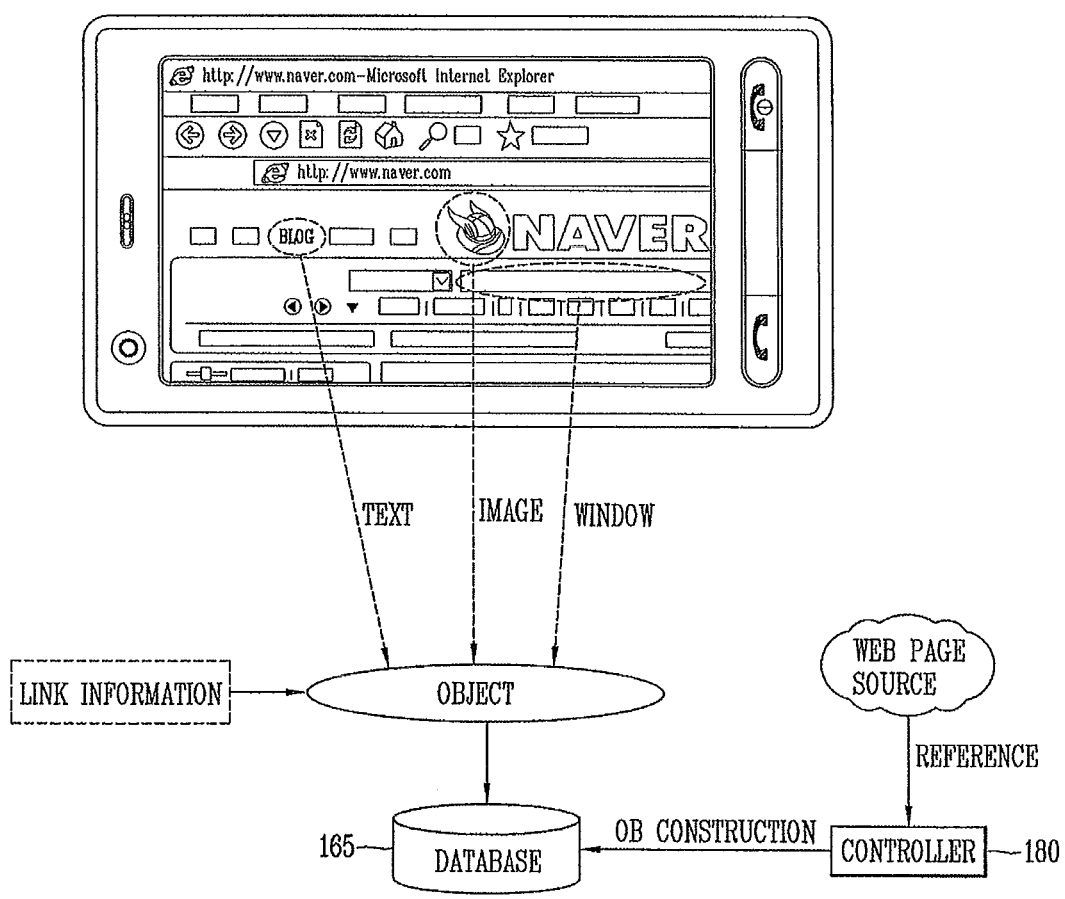
FIG. 13 is an overview showing a method for setting database of objects displayed on a web page according to an embodiment of the present invention.

Next, a method for searching information in the web browsing mode will be explained in more detail. In particular, FIG. 13 is an overview showing a method for setting a database of objects displayed on a web page according to an embodiment of the present invention. As discussed above, and with reference to FIG. 13, the controller 180 can construct objects of a web page (e.g., text, images, windows, etc.) as a database 165 for recognition of a voice command in a web browsing mode. That is, a voice command that can be input in a web browsing mode may be a command for selecting a specific object of a web page and displaying information linked to the selected object, a command for inputting a search word on a search window of a web page and searching relevant information, or a command for searching contents of a currently displayed web page.

In the web browsing mode, the database constructed with the objects of the web page is referred to so as to recognize an object input in a voice command manner, thereby improving a recognition rate for a voice command and a recognition speed. In addition, to construct the database, the controller 180 can refer to a source of a web page. For instance, when the web page has a source of 'HYPER TEXT MARKUP LANGUAGE (HTML)', the objects (e.g., texts, images, window) and information linked to the objects (e.g., an address of another web page) can be analyzed based on the source. Also, the objects of a database may be specified to objects currently displayed on a screen. Accordingly, when the web page is enlarged or reduced according to a user's instruction, the controller 180 can reconfigure the database. The database may also include two or more databases according to a particular web page, and may be stored in the memory 160.

Figure 14:
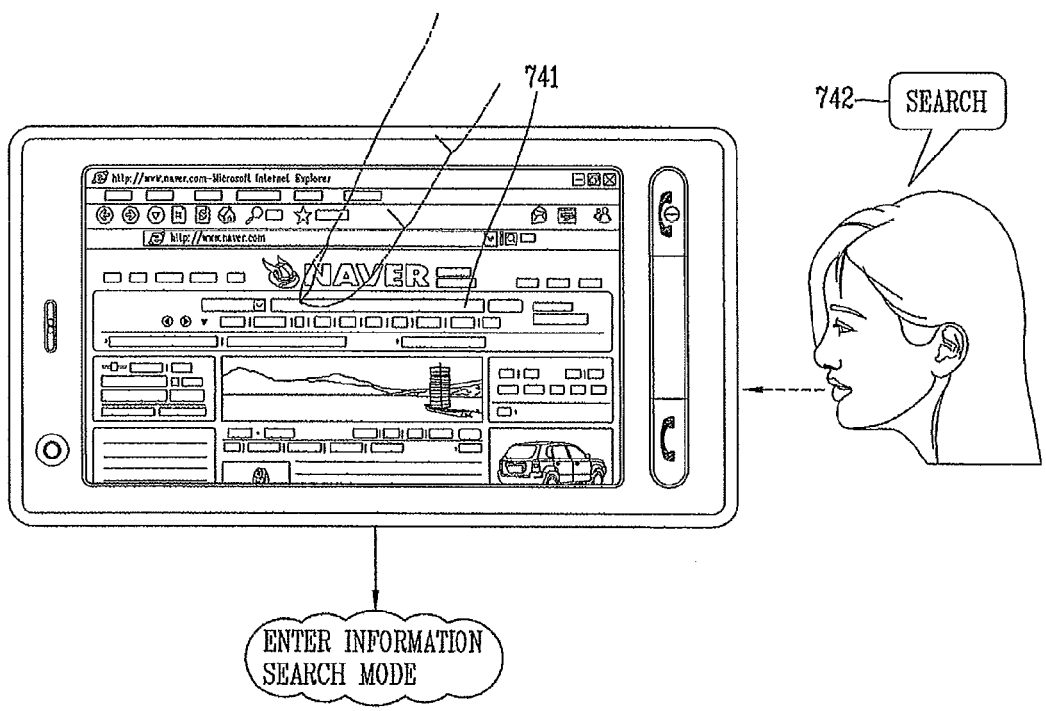
FIG. 14 is an overview showing a method for entering an information search mode from a web browsing mode in a mobile terminal according to an embodiment of the present invention.

Next, FIG. 14 is an overview showing a method for entering an information search mode from a web browsing mode in a mobile terminal according to an embodiment of the present invention. Also, in this embodiment, the displayed web page includes a search word input window 741 the user can use to search for information. In addition, entering an information search mode indicates selecting the search word input window 741, or alternatively searching desired information from contents of a web page currently displayed on a screen. These two different types of search modes will now be explained. First, the search word input window 741 may be selected among objects of the web page in a hardware or soft key input manner or in a touch input manner. Alternatively, the search word input window 741 may be selected among objects of the web page when the user inputs a voice command indicating 'search' as shown by the reference numeral 742 in FIG. 14. Alternatively, the search word input window may be automatically activated or selected upon access the web page. The mobile terminal may thus enter an information search mode through the various input manners.

Figure 15A:
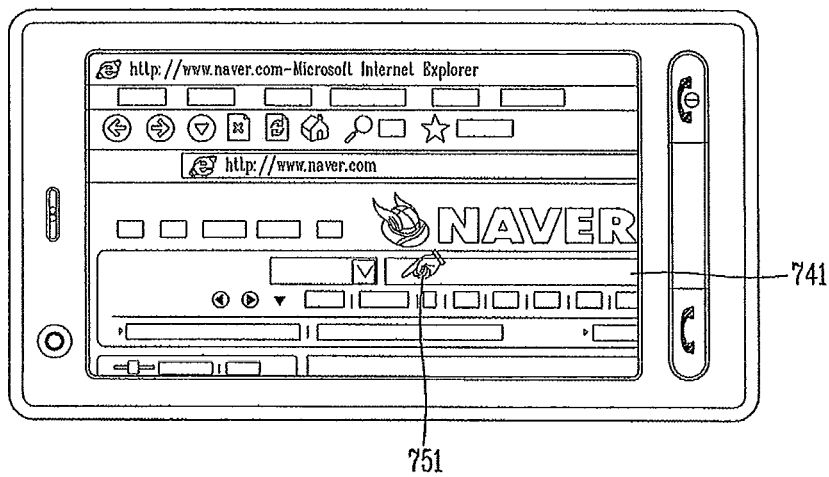
FIGS. 15A to 15C are overviews showing a method for displaying a state that a mobile terminal has entered an information search mode according to an embodiment of the present invention.
Figure 15B:
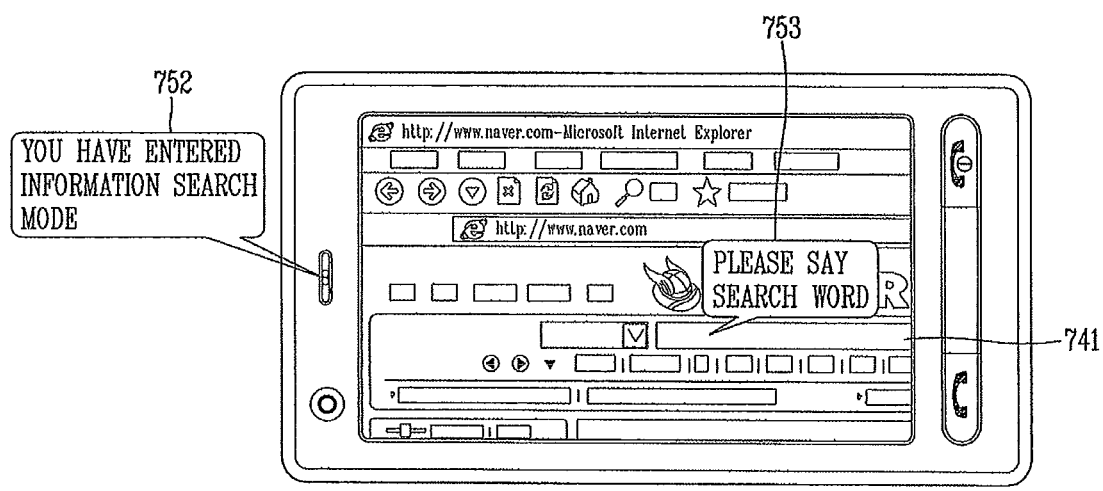
Figure 15C:
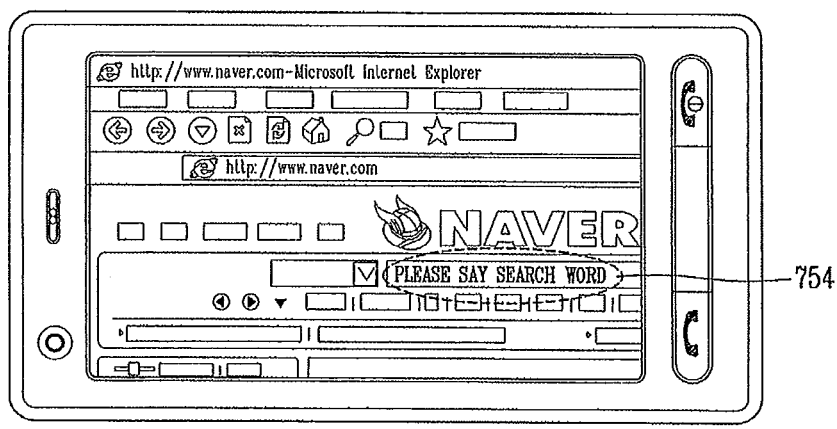

Next, FIGS. 15A-15C are overviews showing a method for displaying a state that a mobile terminal has entered an information search mode according to an embodiment of the present invention. In particular, when the mobile terminal has entered an information search mode via a voice command manner or through other input methods, the controller 180 may inform a user about the entered state, i.e., a state that the search word input window 741 of the web page has been selected. For example, as shown in FIG. 15A, the controller 180 displays an indicator 751 having a specific shape on the search word input window 741 so as to inform a user that the mobile terminal has entered the information search mode. The indicator 751 may be implemented as a still image or as moving images (e.g., flickering effects). The indicator 751 can also have various shapes or sizes.

Referring to FIG. 15B, the controller 180 outputs a guide message 753 using voice or text to inform the user that the mobile terminal has entered an information search mode. In particular, in FIG. 15B, the controller 180 outputs the message 'You have entered information search mode' as indicated by the reference number 752 or the message 'Please input search word' as indicated by the reference number 753. The guide message 753 using text instead of voice may also be displayed in the form of a balloon message. That is, as shown in FIG. 15C, the controller 180 can display a text message 754 in the search word input window 741 to indicate the search mode has been entered. In addition, the controller 180 can also advantageously display the search word input window 741 with an enlarged size or a changed color. For instance, when the search word input window 741 has the same color as the background color before the mobile terminal enters the information search mode, the controller 180 can advantageously change the color of the search word input window 741 to be red after the mobile terminal enters the information search mode. Thus, because the controller 180 distinctively displays the search window 741, the user can quickly see the search mode has been successfully entered.

Figure 16A:
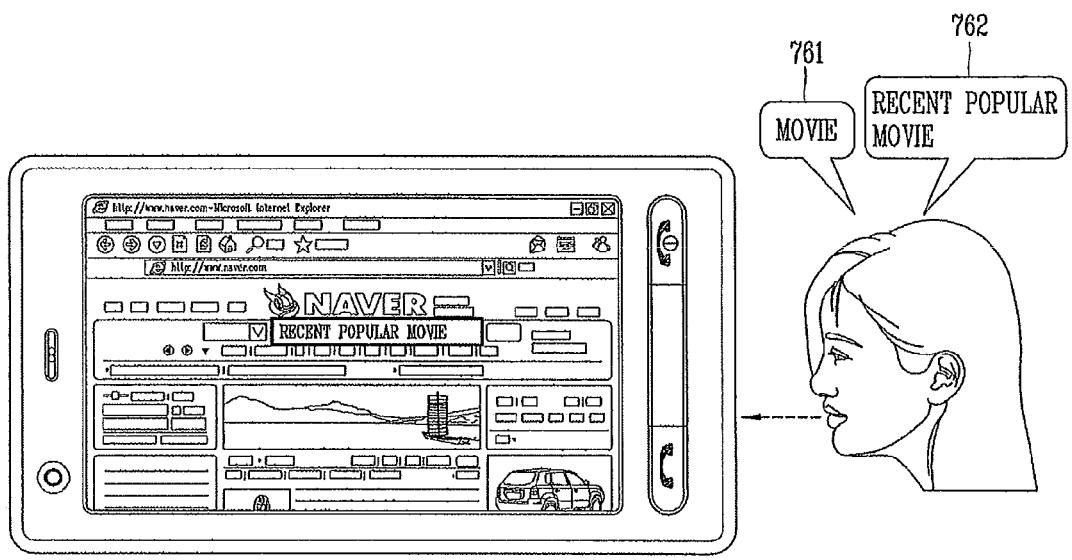
FIGS. 16A and 16B are overviews showing a method for inputting a search word in an information search mode according to an embodiment of the present invention.
Figure 16B:
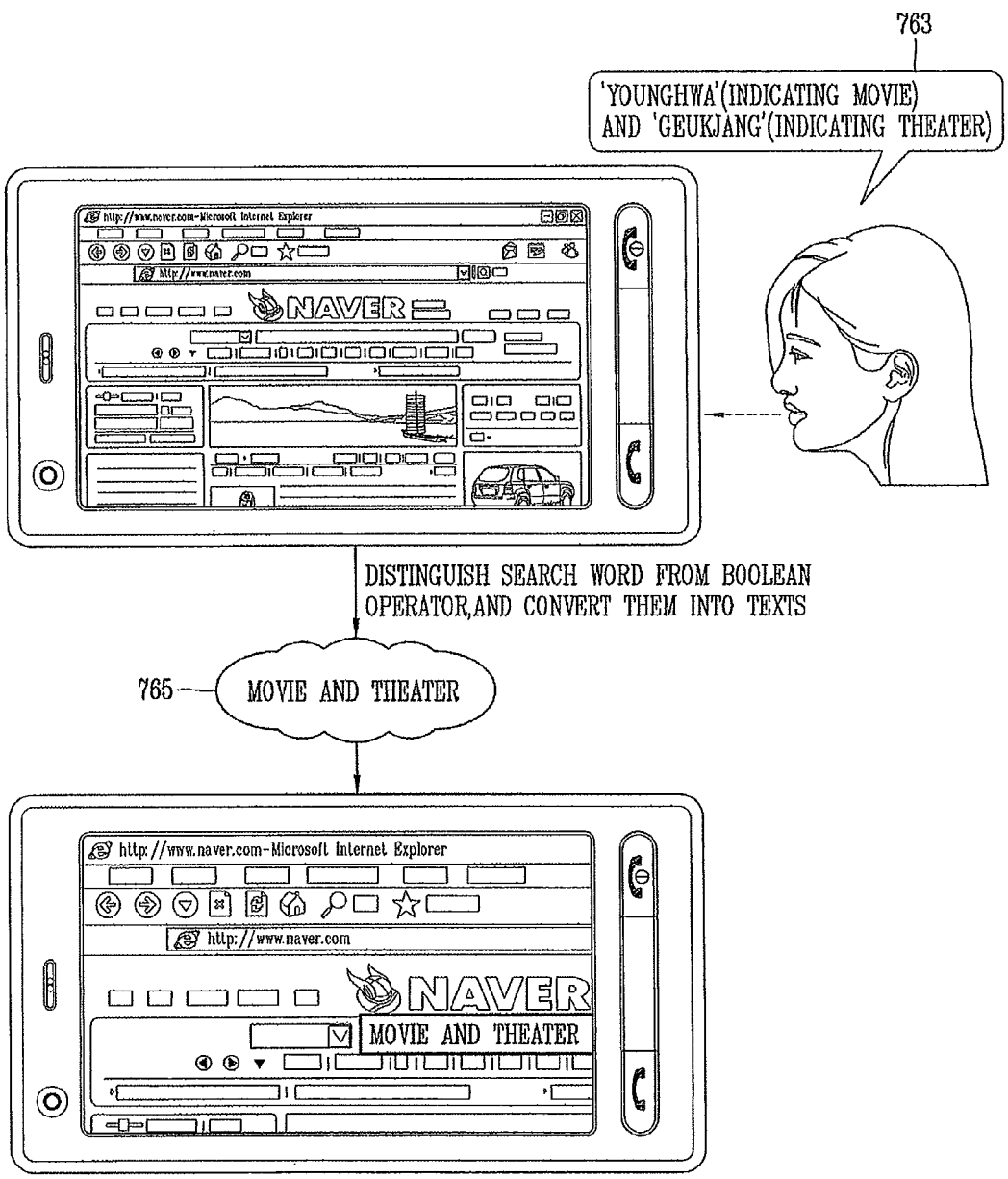

Next, FIGS. 16A and 16B are overviews showing a method for inputting a search word in an information search mode according to an embodiment of the present invention. For example, as shown in FIGS. 16A and 16B, the user has recognized the mobile terminal has entered the information search mode via one of the methods shown in FIG. 15, and may input a search word into the search word input window 741 using a voice command. The controller 180 then converts the input voice command into text using an STT function. In addition, the converted text is distinguished from a general voice command. That is, the meaning of the search word is not judged based on the database, but is only transcribed in a dictation operation until the search word has been completely input.

Further, the controller 180 can also display the converted search word in the input window 741 so the user can verify the search word is correct. The search word may also be displayed on any display region rather than the search word input window 741. However, for convenience purposes, the following description will refer to the input search word being displayed on the search word input window 741. Thus, with reference to FIG. 16A, the user can input one word (e.g., movie) 761 or a phrase or a sentence composed of two or more words (e.g., recent popular movie) 762. Then, when each word is input within a time interval more than one specific time (a first specific time), the controller 180 inserts an empty space between the words converted to text, thereby completing a sentence. However, when the search word is not input for more than another specific time (second specific time), the controller 180 can determine that the search word has been completely input.

In addition, with reference to FIG. 16B, the search word may be input with a Boolean operator (e.g., AND, OR). When the search word (e.g., movie and theater) includes a Boolean operator (e.g., AND), the Boolean operator may be converted only into English differently from other search words. That is, the search words (e.g., movie, theater) are converted into a text language of each country, whereas the Boolean operator (e.g., AND) is converted only into English (e.g., AND) 765. Accordingly, the Boolean operator may play a role of a Boolean operator. For instance, while converting a search word input in Korean into a Korean text, the controller 180 judges whether a Boolean operator has been input. If a Boolean operator has been input, the controller 180 converts the Boolean operator into English.

Figure 17:
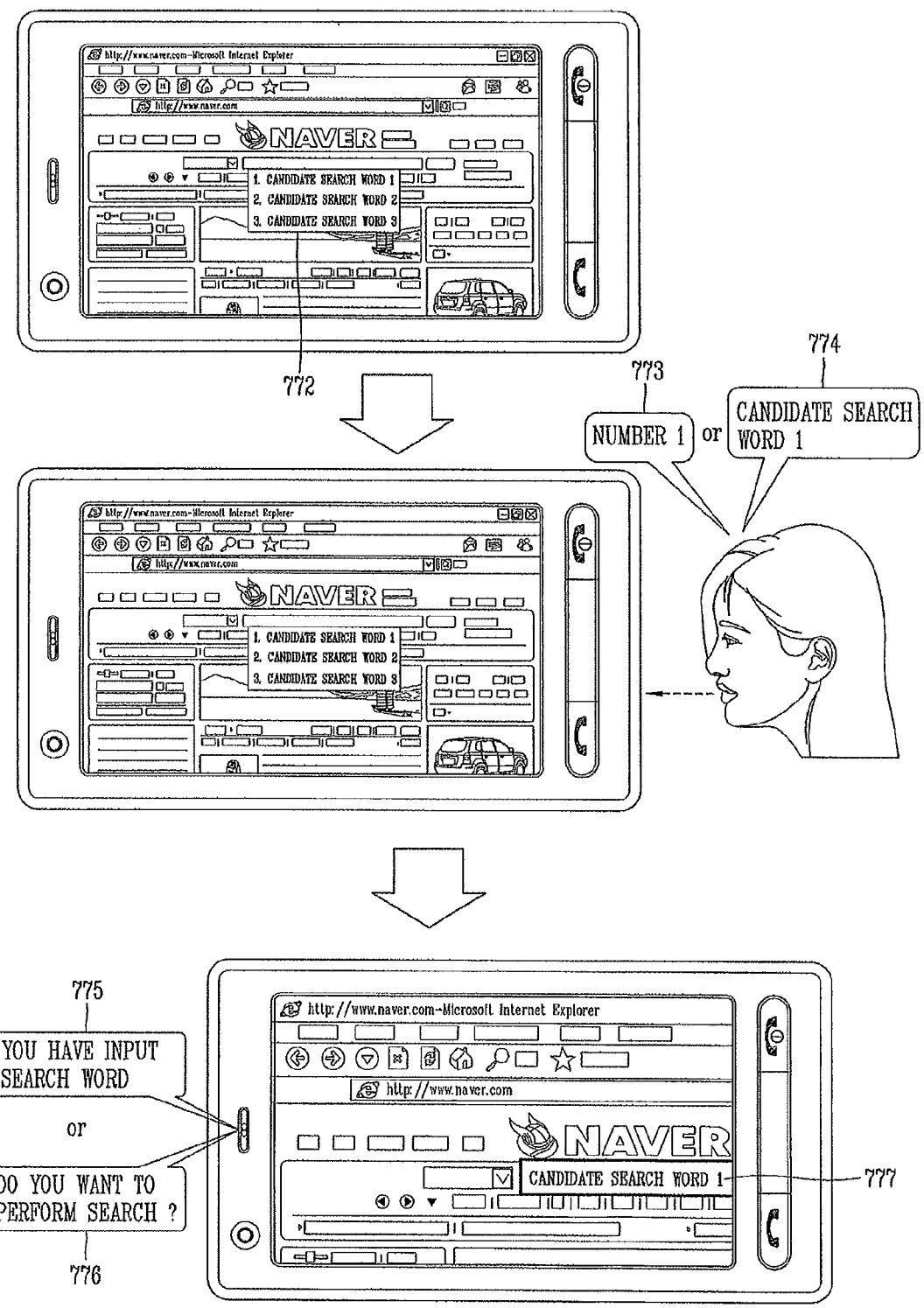
FIG. 17 is an exemplary view showing a method for displaying a search word input in an information search mode according to an embodiment of the present invention.

Next, FIG. 17 is an overview showing a method for displaying a search word input in an information search mode according to an embodiment of the present invention. When a search word is input in a voice command manner or through other methods as described above, the controller 180 inputs the search word onto the search word input window 741. That is, the controller 180 displays the search word on the search word input window 741. Accordingly, the user can check whether or not the search word has been precisely input. Further, the controller 180 can display a search word that has a highest recognition precision among search words input in a voice command manner. However, when there are two or more search words (hereinafter, referred to as 'candidate search words') having a small error within an error range, the controller 180 can display the candidate search words (e.g., candidate search word 1, candidate search word 2, etc.) 772 as shown in the top portion in FIG. 17. In addition, the candidate search words may have priorities determined according to a recognition precision, and may be displayed in the determined orders. The candidate search words may also have numbers according to priorities.

Accordingly, as shown in the middle portion of FIG. 17, the user can select the candidate search word 774 or number 773 of the candidate search word in a voice command manner. Alternatively, the user can select the numbers 773 in a key input manner. The user can also select one of the candidate search words in a direct touch manner. Once the search word has been completely input, the controller 180 displays the selected candidate search word 777 on the search word input window as shown in the lower portion of FIG. 17. The controller 180 can then indicate that the search word has been completely input by outputting a guide message using a text or voice. For example, as shown in the lower portion of FIG. 17, the controller 180 can output a message 775 indicating that the search word has been completely input such as 'You have input search word', and output a corresponding message 776 inquiring whether or not to perform a search operation such as 'Do you want to perform search operation?'. Further, the guide messages using text may be displayed in the form of a balloon message.

Figure 18A:
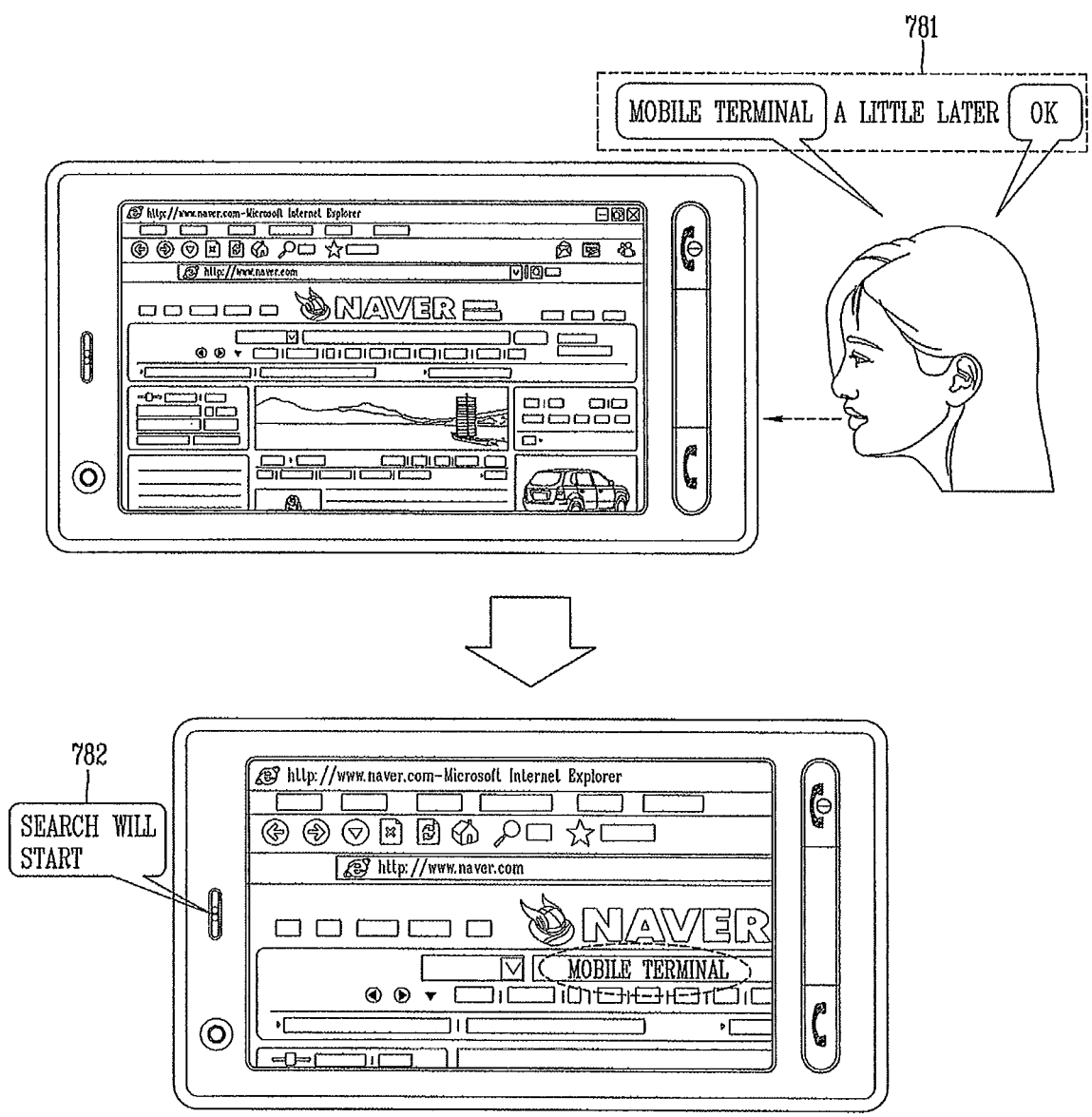
FIGS. 18A and 18B are exemplary views showing a method for indicating information search according to an embodiment of the present invention.
Figure 18B:
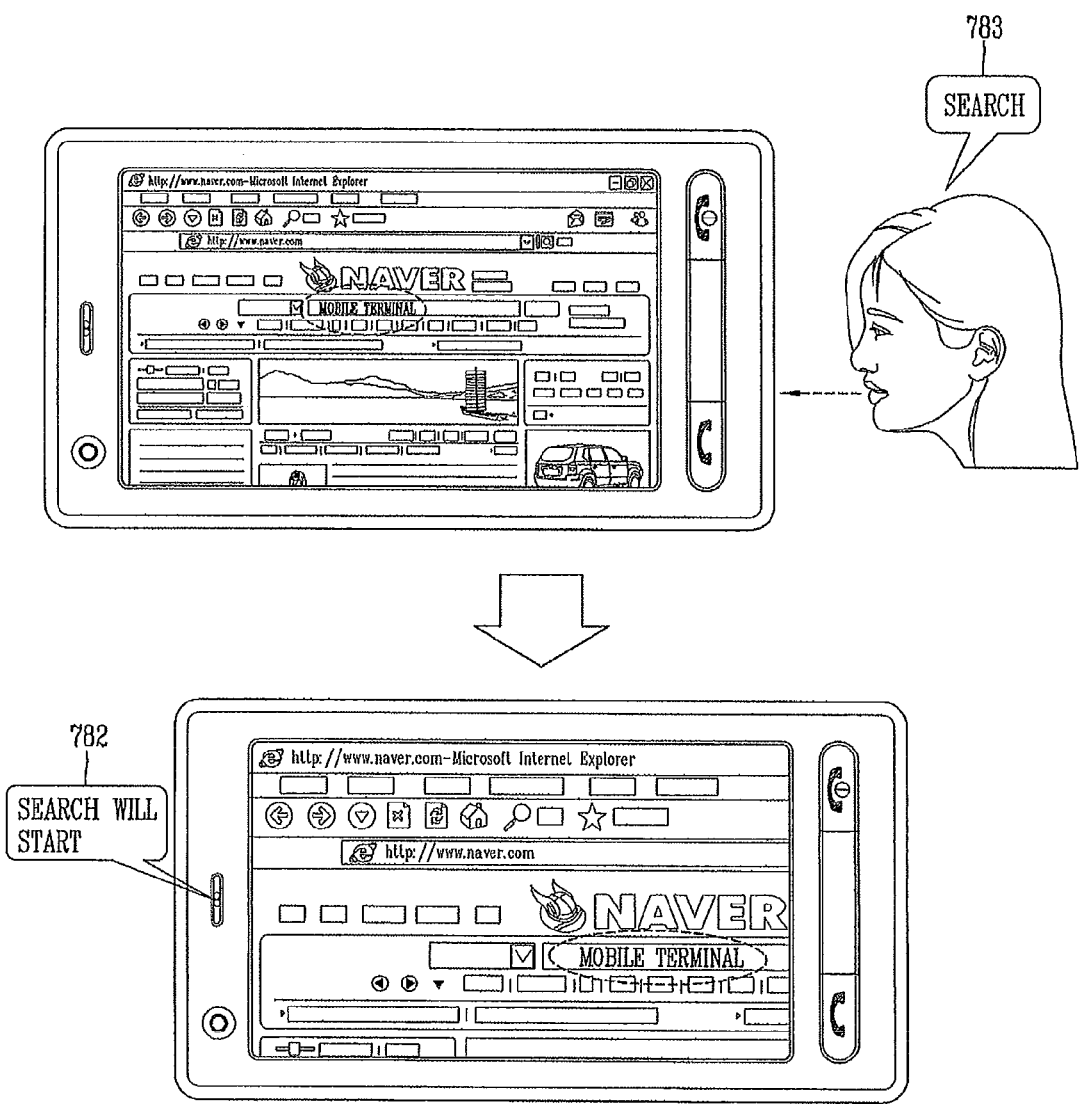

Next, FIGS. 18A and 18B are overviews showing a method for indicating an information search according to an embodiment of the present invention. As discussed above with respect to FIG. 17, once the search word has been completely input, the user may input a command instructing a search operation. The command may be input in a voice command manner or in a hardware or soft key input manner. For example, the user can request a search operation be performed in a voice command manner by responding (Yes or No) to the guide message 776 asking the user if they want to perform a search operation as shown in FIG. 17.

Alternatively, as shown in FIG. 18A, the user may input a preset word or command "OK" together with a search word (e.g., "mobile terminal") as indicated by the reference number 781. For instance, when the user inputs the words 'mobile terminal' and 'OK' within a specific time in a voice command manner, both a search word input and a search operation are performed by the controller 180. Alternatively, the controller 180 may instruct a search operation be performed after a preset time lapses after a search word has been input. In still another example, the controller 180 can perform the search operation based on a preset voice command "Search" as identified by the reference numeral 783 shown in FIG. 18B.

Then, upon receiving the command instructing the search operation be performed, the controller 180 can output a guide message 782 using text or voice (e.g., 'Search will start' or 'Search is being performed.'), or output an indicator having the same meaning. Accordingly, the user can recognize the current state of the mobile terminal to determine that the search is being performed. Also, as discussed above, the search operation is generally not performed by the mobile terminal, but rather the controller 180 sends a search word and a search instruction to a web server, receives results about the search word from the web server, and then displays the results. Accordingly, the user may select any object they desire from the displayed search results. Then, a web page linked to the object is displayed, thereby allowing the user to view details of his or her desired information.

Figure 19:
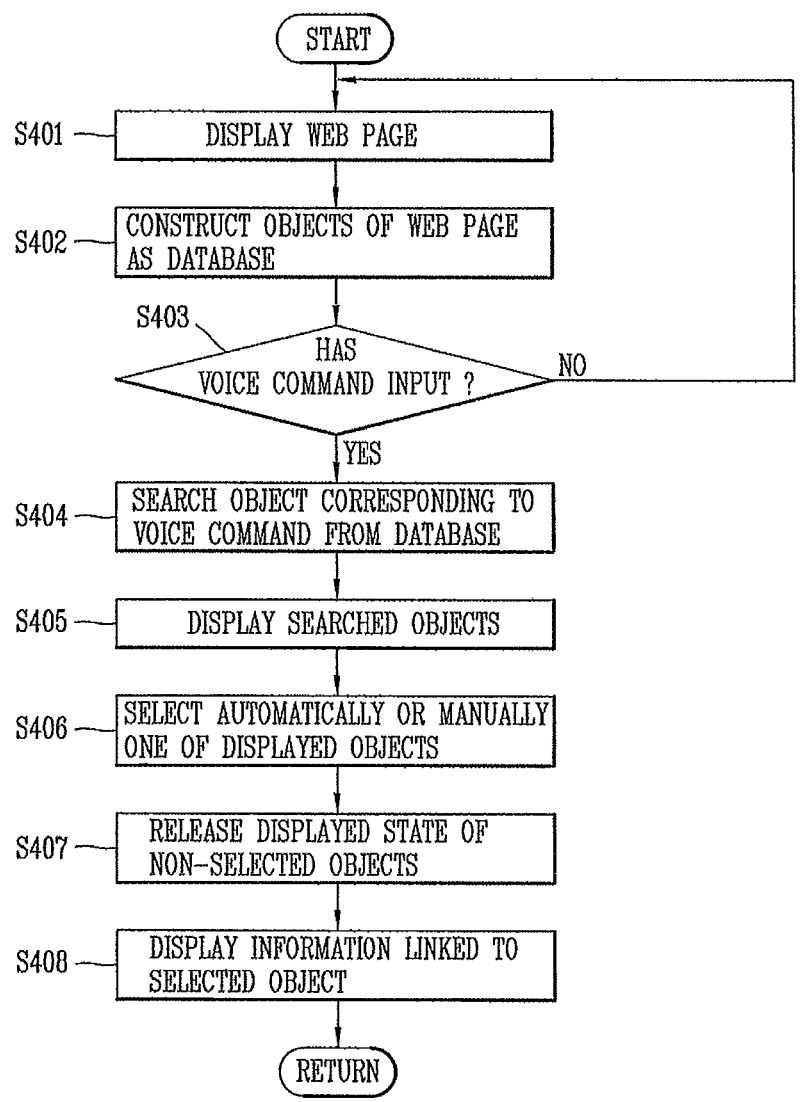
FIG. 19 is a flowchart showing a method for searching a user's desired information in a web page according to an embodiment of the present invention.

Next, a method for searching information from the displayed web page will be explained. That is, as discussed above, the mobile terminal displays text with a very small size due to the small size of the display in spite of its high resolution, while implementing a full browsing capability. Thus, it is difficult for the user to view the text. FIG. 19 is a flowchart showing a method for searching a user's desired information in a web page according to an embodiment of the present invention. In addition, details about the same operations that have been previously described will be omitted.

As shown in FIG. 19, once a web page is displayed (S401), the controller 180 constructs objects of the displayed web page as a database (S402). For example, the displayed web page can be represented as HTML. Then the information contained in the HTML can be used to create data objects in the database. Then, once a voice command is input (Yes in S403), the controller 180 searches objects corresponding to the voice command from the database (S404). For example, the controller 180 can search the HTML constructing the web page for objects or text that includes the converted voice command. Further, the voice command is assumed to be a command instructing contents of the web page to be searched. In order to improve a recognition rate of the voice command, the controller 180 may specify a range of information that can be recognized after being input in a voice command manner into objects displayed on the web page. The controller 180 can also specify the range of information into objects displayed on a current screen among objects displayed on the web page. Then, once objects corresponding to the voice command are searched, the controller 180 displays results of the search (S405). Also, the search results may be the objects or phrases or sentences including the objects.

Further, the search results may be distinctively displayed from other information displayed on the web page. For example, in FIG. 20B, the user has requested the currently displayed web page be searched for the phrase "News Selection". The controller 180 then converts the input voice command into text, and searches the database including objects representing the displayed web page for objects that include the any of the terms "News" or "Selection." As shown in FIG. 20B, the controller 180 distinctively displays the found results 791 and 792 on corresponding positions on the web page with changed object features such that the user can quickly and easily see the objects that were found during the search of the currently displayed web page. For instance, the controller 180 can display the search results with an enlarged size, color changes, background color display, transparency changes, font changes, or underlines for highlighting effects, etc. The search results may also be displayed through various emphasizing methods rather than the above methods.

Figure 20A:
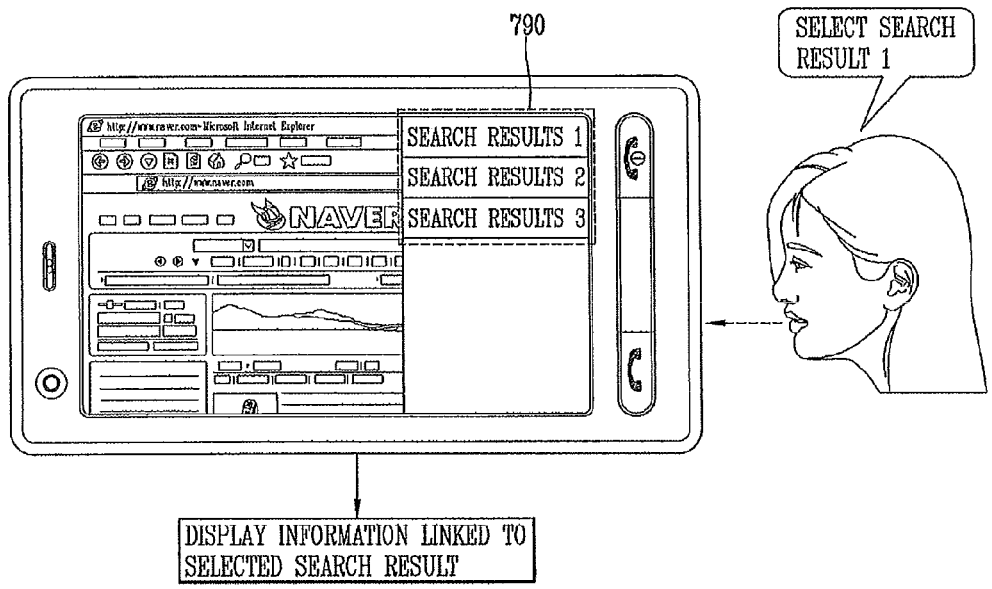
FIGS. 20A and 20B are overviews showing a method for selecting specific information among information obtained as a result of information search according to an embodiment the present invention.
Figure 20B:
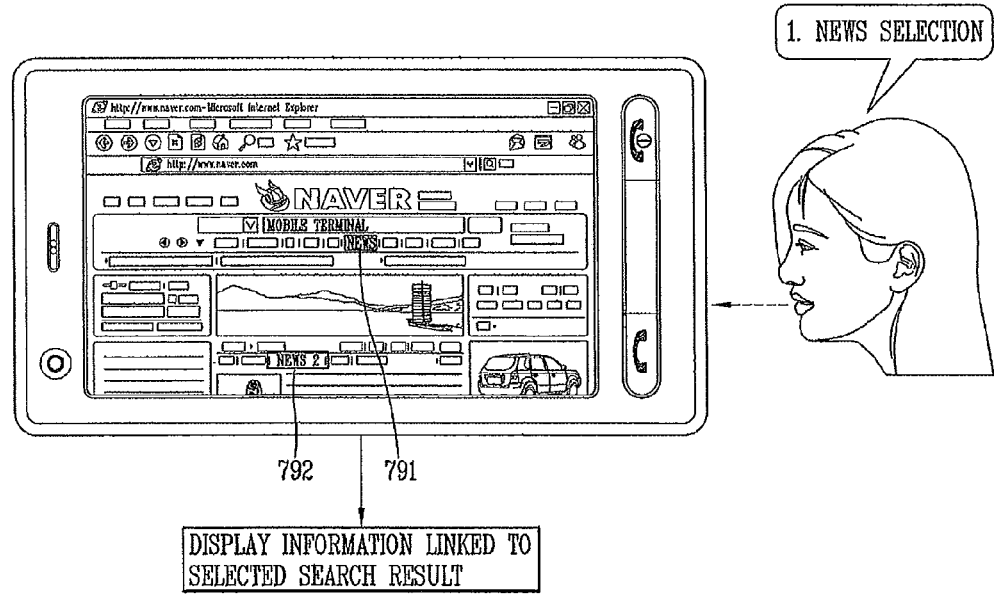

In addition, as shown in FIG. 20A, the search results may be displayed on a specific display region 790. Here, the specific display region 790 may be displayed on a screen divided into a plurality of parts, or on a web page in an overlaying manner. The search results may be also displayed in an 'On Screen Display' (OSD) manner. Further, the search results may be numbered. Then, as shown in FIG. 20A, the user can automatically or manually select one of the search results, by selecting the numbers in a voice command or key input manner, or in a direct touch manner (S406 in FIG. 19). Accordingly, information linked to the selected object can be displayed (S408). Also, once the user inputs a command to cancel the search, the displayed state of the search results may be released. In addition, when a selected command is not input for a preset time after the research results are displayed, the displayed state of the search results may be automatically released. Alternatively, once the user selects one of the search results, the displayed state of the rest research results may be automatically released (S407). In addition, FIGS. 20A and 20B also show a method for selecting specific information among information obtained as a result of information search according to an embodiment of the present invention.

As discussed above, once the user instructs a search relating to a specific object of the web page, the controller 180 searches the specific object or phrases including the object in the database, and displays the results of the search. Then, when a command to select one of the search results is input, a corresponding search result is displayed, and information (web page) linked to the search result is automatically displayed. As the selected search result is displayed, the user can check whether or not a desired search result has been selected. When a specific time lapses after the search result is selected, information linked to the search result may be displayed. Here, the selected object may be displayed with a highlighted state by overlaying an indicator having a specific shape, or by changing a color, a size, or a thickness. In addition, within a preset time after the selected search result is displayed, the user may input a command to cancel the selected search result. Upon the input of the command, a displayed state of a web page linked to the selected research result may be canceled.

In the mobile terminal according to one or more embodiments of the present invention, an information search can be performed through a voice command in a web browsing mode, thereby enhancing a user's convenience. Furthermore, the information search can be easily performed even in a web browsing mode of the mobile terminal having a small screen by using both a touch input method and a voice command input method. In addition, the user can advantageously search for items or objects on a currently displayed web page. The items or objects can be plain text when the web site include text information or can be links to other web sites. Thus, the user can enter the term "people" for example, and the controller 180 will distinctively display all items, text, objects, etc. on the web page that include the term "people" Therefore, the user does not have to visually search the website for desired information, which is often tedious and cumbersome.

In addition, the controller 180 can first enter an information search mode for searching the currently displayed web page before the user speaks the voice information to be used for searching the displayed web page. For example, the information search mode can entered based on a voice command (e.g., "enter search mode"), a key input (e.g., a separate hard key on the mobile terminal), or in a direct touching of a predetermined portion of the displayed web page. Thus, the user can selectively determine when the search mode is entered so that the search mode is not inadvertently entered when the user is speaking and does not want the search mode to be entered. The search mode can also be automatically entered as soon as the web page is displayed.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a wireless communication unit configured to access a web page;
a display unit configured to display the accessed web page; and
a controller configured to:
generate objects of the displayed web page as a database;
receive first input voice information for searching the database;
convert the first input voice information into text information;
search the database including the objects representing the displayed web page for objects that include the converted text information;
distinctively display found objects that include the converted text information from other information displayed on the web page, the found objects displayed on a corresponding location of each of the found objects on the web page with changed object features;
receive second input voice information for selecting one of the distinctively displayed objects on the web page;
select one of the distinctively displayed objects based on the second input voice information and change a display state of the selected object by at least one of changing to a highlighted state, overlaying an indicator having a specific shape, changing a color, changing a size, and changing a thickness of the selected object;
display information linked to the selected object while displaying the web page and release the distinctively display state of other found objects; and
release the distinctively display of the found objects while displaying the web page when the second input voice information is not received in a preset time after the found objects are displayed on the web page.

2. The mobile terminal of claim 1, wherein the controller is further configured to:
distinctively display the found objects by at least one of enlarging a size of the found objects, changing a color of the found objects, changing a background color display of the found objects, changing a transparency of the found objects, underlining the found objects, changing a font of the found objects and highlighting the found objects.

3. The mobile terminal of claim 1, wherein when a corresponding found object includes a link to a separate web page, the controller is further configured to automatically access the separate web page when the corresponding found object is selected with a voice command.

4. The mobile terminal of claim 1, wherein the controller is further configured to construct objects of the displayed web page as a database that can be searched.

5. The mobile terminal of claim 1, wherein the controller is further configured to enter an information search mode for searching the currently displayed web page before the first input voice information is received.

6. The mobile terminal of claim 5, wherein the information search mode is entered based on a voice command, a key input, or in a direct touching of a predetermined portion of the displayed web page.

7. A method of controlling a mobile terminal, the method comprising: displaying an accessed web page on a display of the mobile terminal; generating objects of the displayed web page as a database: receiving first input voice information for searching the database; converting the first input voice information into text information; searching the database including the objects representing the displayed web page for objects that include the converted text information; distinctively displaying found objects that include the converted text information from other information displayed on the web page, the found objects displayed on a corresponding location of each of the found objects on the displayed web page with changed object features; receiving second input voice information for selecting one of the distinctively displayed objects on the displayed web page; selecting one of the distinctively displayed objects based on the second input voice information and changing a display state of the selected object by at least one of changing to a highlighted state, overlaying an indicator having a specific shape, changing a color, changing a size, and changing a thickness of the selected object;
displaying information linked to the selected object while displaying the web page and releasing the distinctively display state of other found objects; and
releasing the distinctively display of the found objects while displaying the web page when the second input voice information is not received in a preset time after the found objects are displayed on the web page.

8. The method of claim 7, wherein the distinctively displaying step distinctively displays the found objects by at least one of enlarging a size of the found objects, changing a color of the found objects, changing a background color display of the found objects, changing a transparency of the found objects.

9. The method of claim 7, wherein when a corresponding found object includes a link to a separate web page, the method further comprises automatically accessing the separate web page when the corresponding found object is selected with a voice command.

10. The method of claim 7, further comprising:
constructing objects of the displayed web page as a database that can be searched.

11. The method of claim 7, further comprising:
entering an information search mode for searching the currently displayed web page before the receiving step receives the first input voice information.

12. The method of claim 11, wherein the information search mode is entered based on a voice command, a key input, or in a direct touching of a predetermined portion of the displayed web page.

* * * * *